(12) United States Patent
Wayama et al.

(10) Patent No.: US 11,005,960 B2
(45) Date of Patent: May 11, 2021

(54) RELAY APPARATUS, CONTROL METHOD, AND INFORMATION PROCESSING SYSTEM

(71) Applicant: CANON KABUSHIKI KAISHA, Tokyo (JP)

(72) Inventors: Hiroshi Wayama, Kawasaki (JP); Michihei Murayama, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/521,765

(22) Filed: Jul. 25, 2019

(65) Prior Publication Data

US 2020/0045124 A1 Feb. 6, 2020

(30) Foreign Application Priority Data

Jul. 31, 2018 (JP) .............................. JP2018-144025

(51) Int. Cl.
| | | |
|---|---|---|
| *H04L 29/08* | (2006.01) | |
| *H04L 12/26* | (2006.01) | |
| *G06F 3/12* | (2006.01) | |
| *H04L 29/06* | (2006.01) | |
| *H04L 12/24* | (2006.01) | |
| *H04L 12/28* | (2006.01) | |

(52) U.S. Cl.
CPC ........ *H04L 67/2823* (2013.01); *G06F 3/1209* (2013.01); *H04L 12/2836* (2013.01);
(Continued)

(58) Field of Classification Search
CPC ........ G06F 3/1203–1221; G06F 3/1223–1237; G06F 3/126–1271; G06F 3/1285–1298; H04L 29/08135; H04L 29/08693; H04L 29/08702; H04L 29/0872; H04L 29/08756; H04L 29/08783; H04L 29/08081; H04L 29/0809–08099; H04L 41/024–0246; H04L 41/04; H04L 41/0627; H04L 41/0645; H04L 43/04; H04L 43/06–067; H04L 51/18; H04L 65/1003–104; H04L 67/00; H04L 67/02–025; H04L 67/06; H04L 67/16; H04L 67/2809;
(Continued)

(56) References Cited

U.S. PATENT DOCUMENTS 7,277,915 B2 * 10/2007 de Boor .................. G06F 9/465
                                                            709/202
9,146,731 B2 *  9/2015 Ohara .................... G06F 8/654
(Continued)

FOREIGN PATENT DOCUMENTS

JP          2015-062143 A          4/2015

*Primary Examiner* — Brendan Y Higa
(74) *Attorney, Agent, or Firm* — Venable LLP

(57) ABSTRACT

A relay apparatus that relays communication between a server which provides a service and a terminal which receives the service is provided. The relay apparatus executes a first communication to transmit a predetermined signal to the terminal in accordance with a first communication protocol, and executes a second communication to receive a response to the predetermined signal by the first communication from the terminal in accordance with a second communication protocol different from the first communication protocol and without using the first communication protocol. In addition, a third communication is executed to communicate with the server based on the reception of the response.

20 Claims, 15 Drawing Sheets

(52) U.S. Cl.
CPC .. *H04L 29/06068* (2013.01); *H04L 29/08099* (2013.01); *H04L 29/08738* (2013.01); *H04L 29/08783* (2013.01); *H04L 41/0226* (2013.01); *H04L 43/065* (2013.01); *H04L 67/025* (2013.01); *H04L 69/08* (2013.01); *H04L 67/42* (2013.01)

(58) Field of Classification Search
CPC ............. H04L 67/2823; H04L 67/2828; H04L 12/2836; H04L 29/06068; H04L 29/08738; H04L 41/0226; H04L 67/26–2814; H04L 69/08
See application file for complete search history.

(56) References Cited

U.S. PATENT DOCUMENTS

| | | | | |
|---|---|---|---|---|
| 2003/0187631 A1* | 10/2003 | Masushige | .......... | H04L 63/0281 703/27 |
| 2011/0173324 A1* | 7/2011 | Wang | ...................... | H04L 67/02 709/225 |
| 2012/0110066 A1* | 5/2012 | Furuta | .................. | G06F 3/1287 709/203 |
| 2012/0117168 A1* | 5/2012 | Sugiyama | ............... | G06F 9/546 709/206 |
| 2012/0254362 A1* | 10/2012 | Li | ........................... | H04L 67/02 709/218 |
| 2014/0040350 A1* | 2/2014 | Stokking | ............. | H04L 67/1091 709/203 |
| 2014/0215083 A1* | 7/2014 | Li | ........................... | H04L 67/02 709/230 |
| 2014/0268236 A1* | 9/2014 | Ohara | ................. | H04N 1/00344 358/1.15 |
| 2014/0280782 A1* | 9/2014 | Ohara | .................... | H04L 67/28 709/219 |
| 2016/0350041 A1* | 12/2016 | Katano | ................... | G06F 3/122 |
| 2018/0152587 A1* | 5/2018 | Katano | ............. | H04N 1/00344 |
| 2018/0164786 A1* | 6/2018 | Shimizu | ............. | G05B 19/4185 |
| 2018/0278692 A1* | 9/2018 | Okayama | ................ | H04L 67/28 |

* cited by examiner

F I G. 10
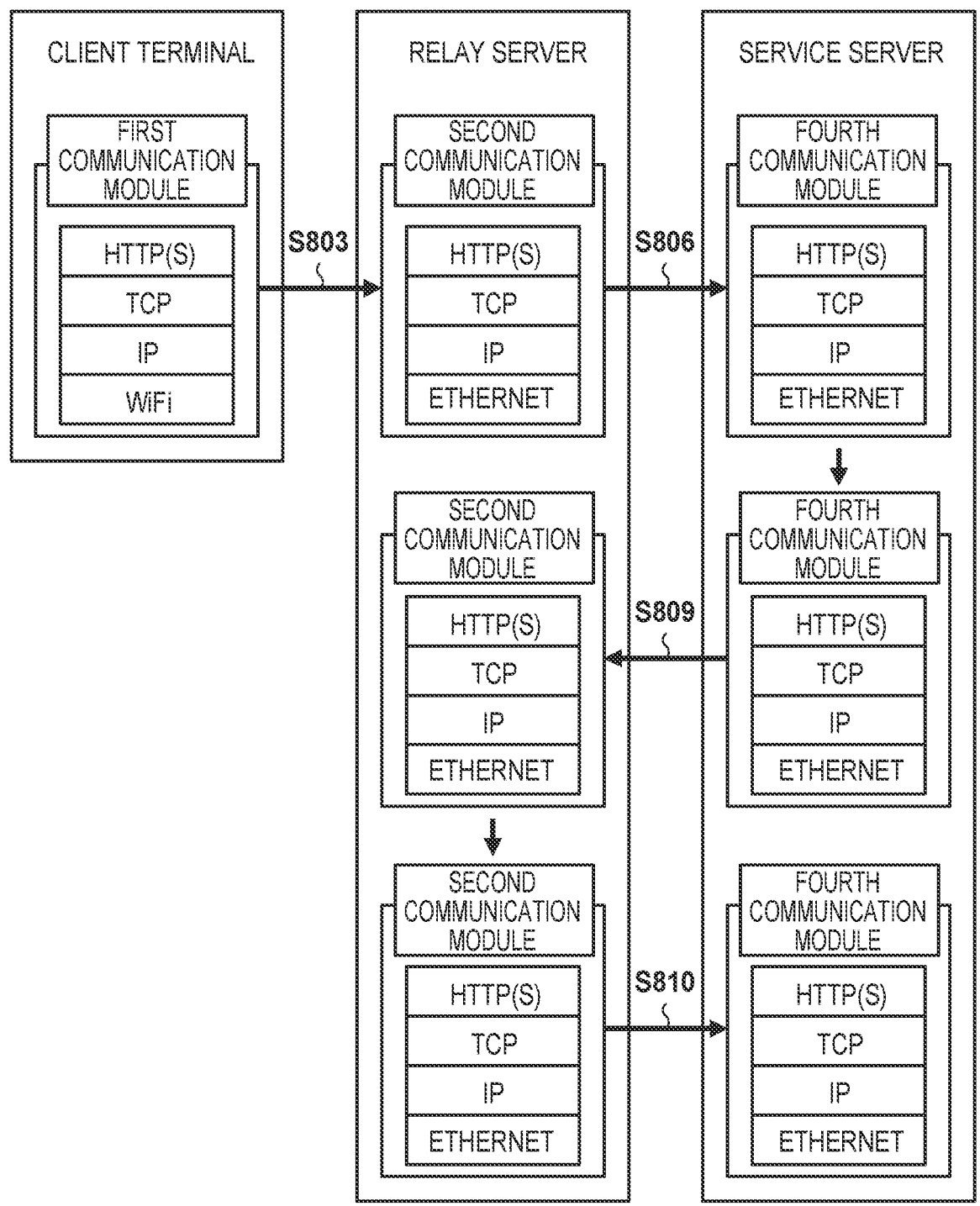

F I G. 12

SERVICE MASTER TABLE — 1001

| UUID | SERVICE ID | REGISTRATION DATE AND TIME |
|---|---|---|
| sjhdf-8ehaf | S-01 | 2013/01/01 |
| 8932h-zxbia | S-02 | 2013/01/01 |
| jn39s-3jhsd | S-03 | 2013/01/01 |

SERVICE REGISTRATION TABLE — 1002

| UUID | SERVICE ID | TERMINAL ID | REGISTRATION DATE AND TIME |
|---|---|---|---|
| aabas-32ckj | S-01 | AAA-01 | 2015/01/02 |
| hewu3-sjsdf | S-03 | AAA-02 | 2015/01/03 |
| sdgio-8sdsa | S-03 | CCC-03 | 2015/01/04 |

CLIENT TERMINAL REGISTRATION TABLE — 1003

| UUID | TERMINAL ID | TERMINAL INFORMATION | REGISTRATION DATE AND TIME |
|---|---|---|---|
| 5rghb-9kggf | AAA-01 | XXX-XXX-XXX | 2015/01/02 |
| Nc35g-8hxff | BBB-02 | XXX-YYY-YYY | 2015/01/03 |
| Vhdrt-65tyg | CCC-03 | XXX-YYY-ZZZ | 2015/01/04 |

CLIENT TERMINAL-SERVICE LINKING TABLE — 1004

| UUID | TERMINAL ID | SERVICE ID | REGISTRATION DATE AND TIME |
|---|---|---|---|
| 675fd-1fssa | AAA-01 | S-01 | 2015/01/02 |
| Maaua-9disa | CCC-03 | S-03 | 2015/01/04 |

RELAY APPARATUS, CONTROL METHOD, AND INFORMATION PROCESSING SYSTEM

BACKGROUND OF THE INVENTION

Field of the Invention

The present invention relates to a communication network configuration technique for improving extensibility.

Description of the Related Art

In recent years, services which are provided via a network such as the Internet have increased, and terminals (client terminals) which are capable of connecting to a network have rapidly increased accordingly. Depending on the service, a relay server for managing these terminals is installed, and the service is provided via the relay server. For example, a case in which a client terminal is an inkjet printing apparatus and the client terminal is used to print data such as a photograph or the like stored by the user on a network using a cloud service will be described. In this case, a service-providing server of the cloud service will notify the client terminal of a print command via a management server which serves as a relay server, and the client terminal will perform printing based on this print command.

In order to execute such a service in real time, the service-providing server, the relay server, and the client terminal need to be in a mutually communicable state. Note that a protocol such as XMPP, MQTT, or the like is used in the communication between the client terminal and the relay server. XMPP and MQTT represent Extensible Messaging and Presence Protocol and Message Queuing Telemetry Transport, respectively. Japanese Patent Laid-Open No. 2015-062143 discloses a procedure for a client terminal to communicate with a server on the Internet by using XMPP.

An XMPP server has a problem in its lack of extensibility. Hence, in a system as described above, it is not easy, problematically, to cope with a rapid increase in the number of terminals which are to be connected to the XMPP server or to add a new server to provide a new service in the already-existing system. Note that it is important not only for a service using XMPP, but also for any service using a predetermined communication protocol to be able to operate flexibly by being able to extend its operation or the like to cope with an increase in the number of terminals or the number of services that use the predetermined communication protocol.

SUMMARY OF THE INVENTION

The present invention provides a technique that allows a system which uses communication to be operated flexibly.

According to one aspect of the present invention, there is provided a relay apparatus that relays communication between a server which provides a service and a terminal which receives the service, comprising: at least one processor; and at least one memory coupled to the at least one processor, wherein the at least one memory stores a computer-readable instruction that causes, when executed by the at least one processor, the relay apparatus to execute first communication to transmit a predetermined signal to the terminal in accordance with a first communication protocol, and execute second communication to receive a response to the predetermined signal by the first communication from the terminal in accordance with a second communication protocol different from the first communication protocol and without using the first communication protocol, and to communicate with the server in accordance with the reception of the response.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 10 is a view for schematically explaining the protocol stacks of the communication performed in FIG. 9;

FIG. 12 is a view showing an example of information to be registered;

DESCRIPTION OF THE EMBODIMENT

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

That is, some or all of the technical features to be described may be replaced by another arrangement that can implement similar technical features. For example, a plurality of functional blocks or steps may be integrated into a single functional block or a single step of a method, or a single functional block or a single step of a method may be divided into a plurality of functional blocks or a plurality of steps of a method. In addition, at least some of the functional blocks or the steps of a method may be omitted as needed.

(System Arrangement)

Figure 1:
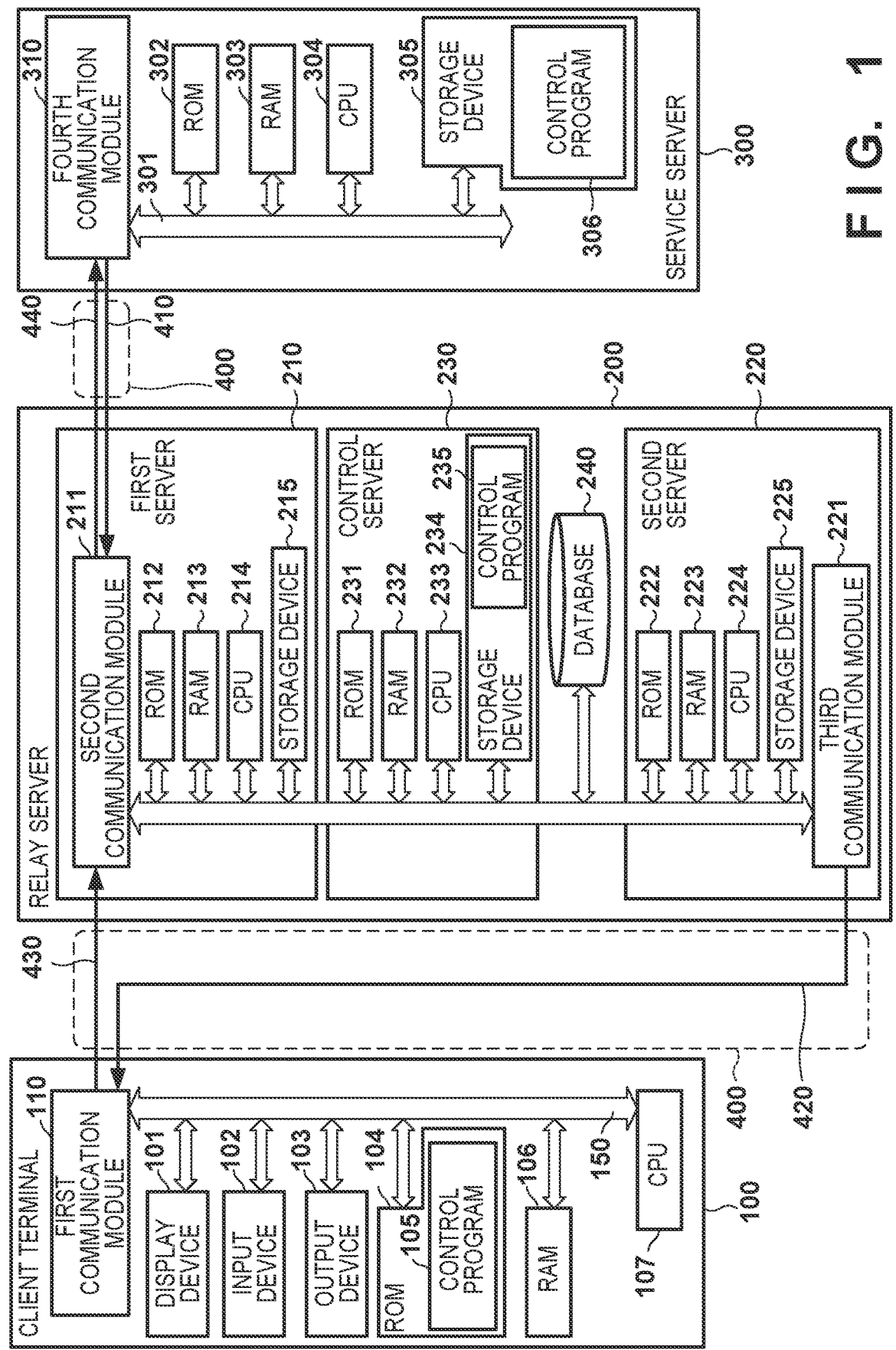
FIG. 1 is a block diagram showing an example of the arrangement of an information processing system.

FIG. 1 shows an example of the arrangement of an information processing system according to the embodiment. The information processing system is formed by a client terminal 100, a relay server 200, and a service server 300. Note that although FIG. 1 describes a case in which one client terminal 100, one relay server 200, and one service server 300 are present, two or more apparatuses may be present for each of these apparatuses. Note that in a case in which there are a plurality of service servers 300, the plurality of service servers 300 can provide different services from each other.

The client terminal 100 is a terminal used by a user, and the service server 300 is a server that provides a predetermined service to provide the information of a printing target image, to accumulate images scanned by the client terminal 100, or the like to the user. The relay server 200 relays the communication related to the service between the client terminal 100 and the service server 300. That is, the client terminal 100 connects to the relay server 200, the relay server 200 connects to the service server 300, and the relay server 200 relays the communication related to the service between the client terminal 100 and the service server 300. As a result, the user can receive the service provided from the service server 300 via the client terminal 100.

The network 400 connects (for example, via a router on the Internet) the client terminal 100 and the relay server 200 to each other and the relay server 200 and the service server 300 to each other. Note that although a common network, as denoted by the same reference numeral in FIG. 1, can be used as the network between the client terminal 100 and the relay server 200 and the network between the relay server 200 and the service server 300, the present invention is not limited to this. For example, it is possible to use two different networks in which each network belongs to a separate network segment. However, in either case, assume that the client terminal 100 will connect to the relay server 200 instead of directly connecting to the service server 300 and connect to the service server 300 via the relay server 200.

In such a system, as described above, XMPP (Extensible Messaging and Presence Protocol) is used for communication between the client terminal 100 and the relay server 200. Note that MQTT (Message Queuing Telemetry Transport) may be used instead of XMPP. The relay server 200 has an XMPP server function for communication by XMPP, and uses this XMPP server function to execute communication by XMPP with one or more client terminals 100. At this time, as described above, it may not be easy to cause the XMPP server to operate flexibly to cope with a rapid increase in the number of the client terminals 100 or with an addition of the service server 300 to execute a new service.

Hence, in this embodiment, communication is performed by using different protocol stacks for a case in which the client terminal 100 belongs to the signal transmitting side and a case in which the client terminal 100 belongs to the signal receiving side. For example, a communication protocol which has a small processing load such as HTTP (Hyper Text Transfer Protocol) or the like is used in a case in which the client terminal 100 is on the signal transmitting side, and XMPP is used in a case in which the client terminal 100 is on the signal receiving side. This will suppress the load of the XMPP server function by limiting the processing executed by the XMPP function server of the relay server 200 to the signal transmission to the client terminal 100. On the other hand, the load of the relay server 200 is reduced by using a communication protocol (for example, HTTP) which has a processing load smaller than that of XMPP in the communication performed in a case in which the client terminal 100 is on the signal transmitting side and communication performed with the service server 300. This can reduce the load of the XMPP server even if the number of client terminals 100 rapidly increases. Furthermore, by arranging a server which uses a first communication protocol such as HTTP or the like and a server which uses a second communication protocol such as XMPP or the like as separate servers, it becomes possible for the relay server 200 to operate more flexibly. That is, the relay server 200 can be arranged as, for example, a server group formed by a plurality of servers which are separated for respective functions in, for example, a local area network (LAN). A more flexible operation can be possible by using a separate server for each function and performing updating for each of these separate servers so that an arrangement more suitable for system operation can be obtained. Note that even if the relay server 200 is arranged physically as a server group formed by a plurality of servers, it will be logically recognized as a single relay apparatus by the client terminal 100 and the service server 300.

The arrangement of each apparatus will be described next.

The client terminal 100 is formed by, for example, a first communication module 110, a display device 101, an input device 102, an output device 103, a ROM 104, a control program 105, a RAM 106, and a CPU 107. ROM, RAM, and CPU are acronyms of read only memory, random access memory, and central processing unit, respectively.

The first communication module 110 is a functional module for the client terminal 100 to communicate with an external apparatus (for example, the relay server 200). The first communication module 110 transmits, for example, a signal to the relay server 200 by using a protocol stack including HTTP, and receives a signal from the relay server 200 by using a protocol stack including XMPP. That is, the first communication module 110 is formed so that different protocol stacks are used for transmission and reception. Details of the first communication module 110 will be described later with reference to FIG. 2.

The display device 101 is, for example, a lamp that displays information by emitting a light pattern or a display that displays information by using a screen. The display device displays information obtained as a result from an input made to the client terminal 100 by the user, information obtained as a result of executing various kinds of processing, and the like. Note that the display device 101 may include a loudspeaker and a vibration member so that, instead of or in addition to a visual output, various kinds of information outputs, for example, an audio output such as a voice and a vibration output can be performed.

The input device 102 is formed by, for example, a keyboard, a pointing device (mouse), a touch pad, and the like. The input device accepts a user operation and loads a command indicating the user operation into the client terminal 100. Note that the input device 102 may have any kind of apparatus arrangement as long as it can accept a user operation and a user instruction. For example, the input device 102 may be a microphone that obtains a user instruction by voice, a camera that obtains a user instruction in accordance with the movement of the user by capturing the user's movement, a sensor that detects that the client terminal 100 has been shaken, or the like. In addition, the display device 101 and the input device 102 may be implemented as a single device by using, for example, a touch panel.

The output device 103 outputs a resultant product of the command input by the input device 102. The output device 103 is, for example, a printing apparatus that discharges ink onto a print medium (for example, paper) and outputs the print medium on which an ink image is formed as the resultant product. The output device 103 is also, for example, an interface which connects to an external storage device and can cause the external storage device to accumulate the resultant product by outputting the resultant product to the external storage device. An output other than these may also be performed by the output device 103.

The ROM 104 is a nonvolatile memory and holds, for example, program codes (for example, that have undergone binary translation) to be executed by the client terminal 100. The program codes include the control program 105. The control program 105 is, for example, a program for controlling the entire client terminal 100 (the first communication module 110, the display device 101, the input device 102, the output device 103, and the RAM 106). For example, the first communication module 110 is controlled by the control program 105 being executed by the CPU 107, and signal exchange processing is executed in the first communication module 110 under this control. The RAM 106 is a volatile memory and stores temporary information. The CPU 107 executes various kinds of control such as the control of the entire client terminal 100 and the like. The CPU 107 reads out, for example, the control program 105 from the ROM 104, loads the control program to the RAM 106, and executes various kinds of control by using the RAM 106 as a work space. Note that the CPU 107, the ROM 104, and RAM 106 are merely examples of a processor and memories, and a processor and memory arrangement other than this may be used. In addition, for example, at least some of the processing operations may be executed by using dedicated hardware such as an ASIC (Application Specific Integrated Circuit), an FPGA (Field Programmable Gate Array) which is set to execute predetermined processing in advance, or the like.

In one example, the devices described above are all connected to each other by an electrical communication bus 150.

In the client terminal 100, in a case in which the client terminal 100 is, for example, an inkjet printing apparatus, the display device 101 will display, to the user, information such as the paper size setting, setting to determine color printing or monochrome printing, and the like. The user will use the input device 102 to make the print settings of the client terminal 100, the CPU 107 will control the output device 103 by executing a program stored in the ROM 104, and the output device 103 outputs a printed product.

The relay server 200 is formed by a first server 210, a second server 220, a control server 230, and a database 240. The first server 210, the second server 220, the control server 230, and the database 240 are electrically connected to each other by a line such as a bus 250. Although the relay server 200 can be handled externally as a logically single apparatus, it is physically formed by a server group including a plurality of serves as shown in FIG. 1, and formed so that this plurality of servers can communicate with each other via a local area network (LAN) or the like which cannot be accessed from the outside. Note that although it has been described that the relay server 200 includes the first server 210, the second server 220, and the control server 230, all of the functions of these servers may be implemented by a single server.

The first server 210 is formed by, for example, a second communication module 211, a ROM 212, a RAM 213, a CPU 214, and a storage device 215. In a similar manner, the second server 220 is formed by a third communication module 221, a ROM 222, a RAM 223, a CPU 224, and a storage device 225. Note that the second server 220 is implemented as a server formed by using, for example, a general-purpose server in which the third communication module 221 uses XMPP to transmit a signal to the client terminal 100. The first server 210 is also implemented as a server formed by using, for example, a general-purpose server in which the second communication module 211 uses HTTP or the like to receive a signal from the client terminal 100 or communicate with the service server 300. The control server 230 is, for example, a general-purpose server and is formed by a ROM 231, a RAM 232, a CPU 233, and a storage device 234. Note that the storage device 234 of the control server 230 stores a control program 235 which includes, for example, a control program of the first server 210 and the second server 220 and a program to control the database 240. However, the first server 210 and the second server 220 can be formed to be capable of executing predetermined communication processing regardless of the control performed by the control server 230. Note that the processor and memory arrangement of the CPU, the RAM, the ROM, and the like are not limited to this. An arbitrary arrangement formed by a memory (storage device) and a processor which can execute various kinds of processing may be used. The database 240 is a database that is read and written by the first server 210, the second server 220, and the control server 230, and stores user information and information necessary for providing a service.

The service server 300 is formed by a fourth communication module 310, a ROM 302, a RAM 303, a CPU 304, and a storage device 305. The storage device 305 stores a program to control the overall service server 300. Note that the fourth communication module 310, the ROM 302, the RAM 303, the CPU 304 and the storage device 305 are connected to each other by an electrical wiring bus 301.

The network 400 is, for example, one of the Internet, an intranet, a LAN, a WAN, a telephone line, a dedicated digital line, an ATM, a frame relay line, a cable TV line, a wireless data broadcasting line, and the like or a combination of these networks. Note that these are merely examples, and a network other than these may be used. Note that the network 400 may be either a wired network or a wireless network, and it may be arranged so that, for example, a partial section is formed by a wired network and the remaining section is formed by a wireless network. For example, between the client terminal 100 and the relay server 200, the client terminal 100 can connect to a wireless LAN router, and the wireless LAN router can connect to the relay server 200 by a wired line.

Note that in this embodiment, as described above, communication from the relay server 200 to the client terminal 100 is performed by using a protocol stack including XMPP, and communication other than this is performed by using a protocol stack including a communication protocol other than XMPP such as HTTP or the like. That is, when information is to be transmitted from the service server 300 to the relay server 200, information 410 is transmitted from the fourth communication module 310 to the second communication module 211 by using a first protocol stack. Also, when information is to be transmitted from the relay server 200 to the client terminal 100, information 420 is transmitted from the third communication module 221 to the first communication module 110 by using the second protocol stack. On the other hand, when information is to be transmitted from the client terminal 100 to the relay server 200, information 430 is forwarded from the first communication module 110 to the second communication module 211 by using a third protocol stack. In addition, when information is to be transmitted from the relay server 200 to the service server 300, information 440 is transmitted from the second communication module 211 to the fourth communication module 310 by using a fourth protocol stack. At this time, the second protocol stack and the third protocol stack used in the communication between the client terminal 100 and the relay server 200 are formed by different communication protocols from each other. For example, the second protocol stack includes XMPP, and the third protocol stack does not include XMPP. Note that in this embodiment, neither the first protocol stack nor the fourth protocol stack includes XMPP. Note that although it is assumed that the first protocol stack, the third protocol stack, and the fourth protocol stack are formed by the same communication protocol, they may include different communication protocols from each other.

A description will be given hereinafter in accordance with communication protocols set in the Internet protocol suite. The second protocol stack and the third protocol stack have in common, for example, a network interface layer, a network layer, and a transport layer, and these layers can be Ethernet® or Wi-Fi®, IP, and TCP, respectively. XMPP is used in the application layer of the second protocol stack and HTTP is used in the application layer of the third protocol stack. Note that TCP and IP are acronyms of Transmission Control Protocol and Internet Protocol, respectively. Note that although this embodiment will describe an example in which HTTP and XMPP are used as the protocols of the application layer, another application protocol may be used. For example, an MQTT protocol may be used. Also, the transport layer protocol is not limited to TCP, and another protocol may be used. Similarly, the network layer protocol is not limited to IP, and another protocol may be used. Note that since it will be assumed that communication is encrypted in this embodiment, HTTP and XMPP will be written hereinafter as HTTP(S) and XMPP(S), respectively to explicitly indicate the encrypted communication performed in the application layer.

Figure 2:
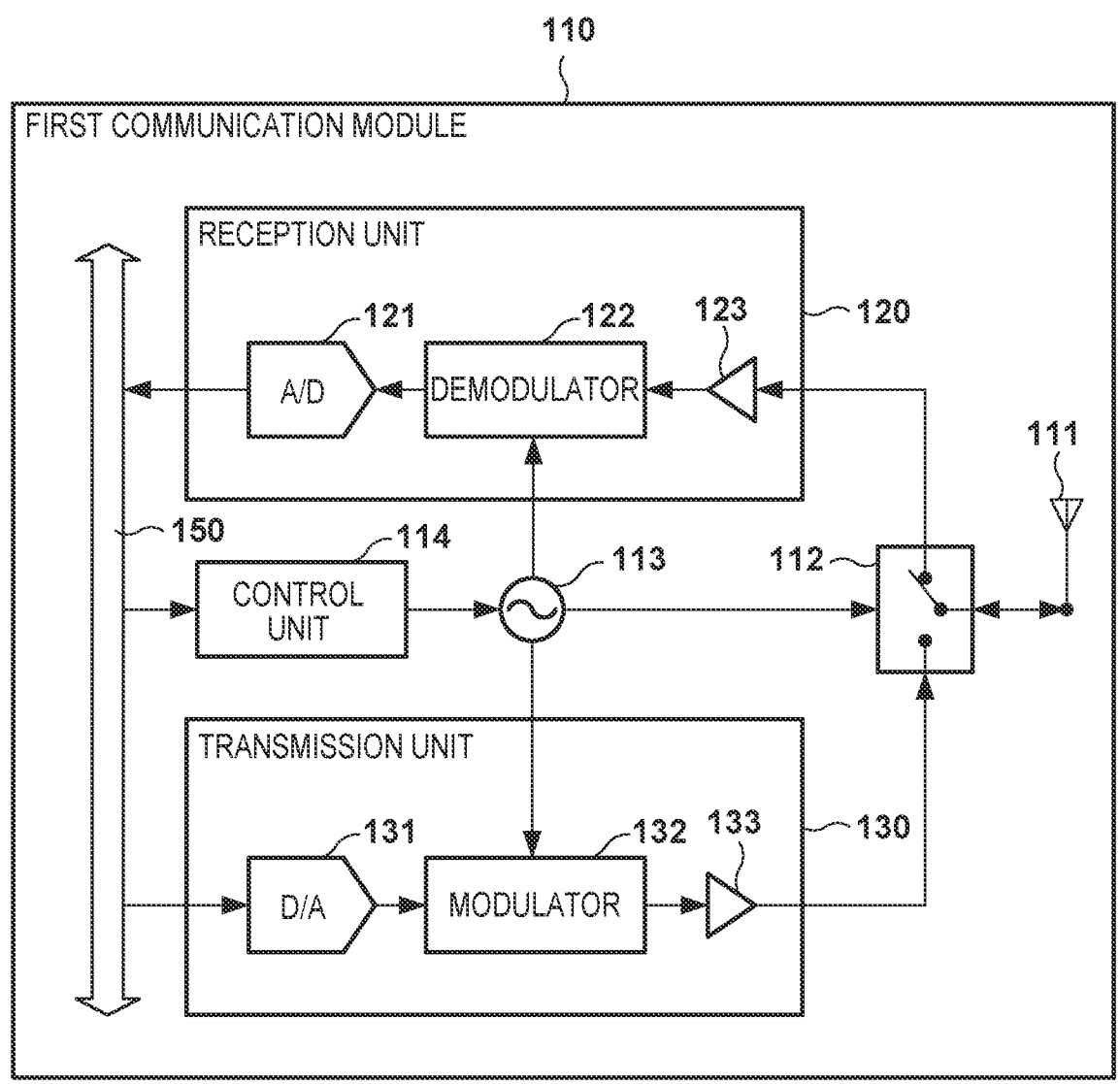
FIG. 2 is a block diagram showing an example of the arrangement of a first communication module.

FIG. 2 is a block diagram showing an example of the arrangement of the first communication module 110 included in the client terminal 100. Although the first communication module 110 is assumed to be a communication module for wireless communication in this embodiment, the present invention is not limited to this. The first communication module 110 may be a wired communication module. The first communication module 110 includes, in a similar manner to a general wireless communication module, a reception unit 120, a transmission unit 130, a transmission/reception antenna 111, a switch 112 for switching between transmission and reception, an oscillator 113, and a control unit 114. The reception unit 120 includes an ADC (analog-digital converter) 121, a demodulator 122, and an LNA (low noise amplifier) 123. The transmission unit 130 includes a DAC (digital-analog converter) 131, a modulator 132, and a PA (power amplifier) 133.

A segment that has been transmitted from the third communication module 221 and has arrived at the first communication module 110 via the network 400 is received as a wireless signal by the transmission/reception antenna 111. Note that this segment includes the header information of the second protocol stack in which the application layer uses XMPP(S). This wireless signal (segment) is transmitted to the reception unit 120 by setting the switch 112 to connect the reception unit 120 and the antenna 111. The wireless frequency (RF) signal transmitted to the reception unit 120 is amplified by the LNA and input to the demodulator 122. The demodulator 122 converts the RF signal into an intermediate frequency or a baseband signal by using a frequency signal generated by the oscillator 113. Subsequently, the signal is converted into a digital signal and output by the ADC 121. Note that the ADC 121 can digitize, for example, an intermediate frequency or a baseband analog signal, and perform various kinds of processing such as demodulation based on the modulation scheme of this signal, error correction decoding, and the like on the digitized baseband signal. The output digital signal is input to the control unit 114 or the CPU 107 via the communication bus 150. Subsequently, the control unit 114 or the CPU 107 analyzes the header of this signal and stores the obtained data in the RAM 106.

When a segment is to be transmitted to the second communication module 211, the CPU 107 or the control unit 114 will generate a digital signal in which an HTTP(S) header of the application layer or another required header has been added to the data, and output the digital signal to the DAC 131. The DAC 131 converts the input digital signal into an analog signal, and the modulator 132 outputs a wireless frequency signal after modulating the analog signal by using a frequency signal generated by the oscillator 113. Note that the DAC 131 can perform processing operations such as error correction coding, padding to make the data suitable for the transmission frame format, analog baseband signal generation by primary modulation, and the like. Subsequently, the wireless frequency signal is amplified by the PA 133 and transmitted outside the client terminal 100 via the transmission/reception antenna 111.

In this manner, the client terminal 100 can use different communication protocol stack to exchange data. Note that the arrangement shown in FIG. 2 is merely an example, and an arrangement other than this may be used as long as it is an arrangement that can obtain data by performing analysis on a header based on the received signal and that can generate a transmission signal by adding the header of each type of protocol to the data.

(Communication Procedure)

The procedure of processing related to communication according to this embodiment will be described next.

First, an example of the procedure of communication performed when data is to be transmitted from the service server 300 to the client terminal 100 will be described with reference to FIG. 3. Note that the processing to be described here is applicable to various kinds of communications related to a service, and the data to be exchanged is not particularly limited. Hence, only the sequence of the signal will be shown in FIG. 3, and the contents of the data to be transmitted will not be shown.

This processing is executed, for example, in a case in which the user accesses a terminal different from the client terminal 100 or accesses the service server 300 by using another computer and makes an instruction to the service server 300 to provide a service to the client terminal 100 as a target. More specifically, assume below that the client terminal 100 is a printing apparatus and the service server 300 is a server which provides a storage service. An example of a case in which the user accesses the service server 300 to cause the client terminal 100 to print image data stored in the service server 300 will be described. Note that the service server 300 can provide a user interface for print execution and an image selection screen via the screen or the like of the personal computer of the user. The user can select, via his/her user interface, an image stored in the service server 300 and the client terminal 100, which is the output destination printing apparatus, to cause the client terminal 100 to execute image printing.

In this processing, first, the CPU 304 of the service server 300 generates, in accordance with the format defined by the Internet protocol suite, a segment including the header information of the first protocol stack which is to be the transmission target. For example, upon receiving a selection of the print-target image and a print execution instruction from the user, the CPU 304 of the service server 300 generates a segment which includes the URL (uniform resource locator) of the stored image as the data. At this time, the CPU 304 generates the segment by adding, to the data, the header information of the protocol stack in which HTTPS is used in the application layer, TCP is used in the transport layer, IP is used in the Internet layer, and Ethernet is used in the network interface layer. Note that the CPU 304 includes the IP address of the second communication module 211 as the transmission destination as the IP header in the segment. The CPU 304 may also include the identification information of the user in the data portion of this segment. The CPU 304 forwards the generated segment to the fourth communication module 310 (S501). Subsequently, the fourth communication module 310 transmits the segment to the first server 210 (the second communication module 211) in the relay server 200 via the network 400 (S502).

In the first server 210, the CPU 214 obtains the segment in response to the reception of the segment by the second communication module 211 (S503). The CPU 214 analyzes the segment in accordance with the format defined by the Internet protocol suite and obtains various kinds of necessary information such as the URL of the transmitted data, the identification information of the user, the reception time, and the like. Next, the CPU 214 writes the result in the database 240 (S504).

The CPU 233 of the control server 230 monitors the state of the database 240 at a predetermined cycle (S505). When data is written in the database 240 by the CPU 214 of the first server 210 in S504, the CPU 233 detects this writing operation and reads out the data from the database 240. Then, the CPU 233 generates a segment by adding, to the data which has been read out, header information in which XMPP(S) is used in the application layer, TCP is used in the transport layer, IP is used in the Internet layer, and Ethernet is used in the network interface layer. The CPU 233 forwards the generated segment to the CPU 224 of the second server 220 (S506).

Upon receiving the segment from the CPU 233 of the control server 230, the CPU 224 of the second server 220 forwards the segment to the third communication module 221 (S507). Note that the CPU 233 of the control server 230 may notify the CPU 224 of the second server 220 that the data has been written without generating a segment. In this case, the CPU 224 of the second server 220 can read out the data from the database 240 and generate a segment including this data. Note that the CPU 224 can forward the segment to the third communication module 221 upon confirming that the third communication module 221 has established XMPP communication with the first communication module 110. That is, if the third communication module 221 has not established the XMPP communication with the first communication module 110, the CPU 224 will suspend the generation of the segment or prevent the forwarding of the segment to the third communication module 221. Note that in a case in which the forwarding of the segment to the third communication module 221 is to be suspended, the generated segment can be stored in the RAM 223. Subsequently, as soon as the XMPP communication is established, the CPU 224 reads out the segment and forwards the segment to the third communication module 221. The third communication module 221 forwards the segment to the first communication module 110 of the client terminal 100 via the network 400 (S508).

Upon detecting that the first communication module 110 has received the segment, the CPU 107 of the client terminal 100 obtains the segment (S509) and analyzes the segment in accordance with the format defined by the Internet protocol suite. Subsequently, the CPU 107 executes processing based on the contents of the data obtained by the analysis, and controls the output device 103 in accordance with this processing result (S510). In this processing example, the URL of the image data is included in the data obtained by the analysis, and the CPU 107 will download the image data based on the URL and execute printing by using the output device 103.

Figure 3:
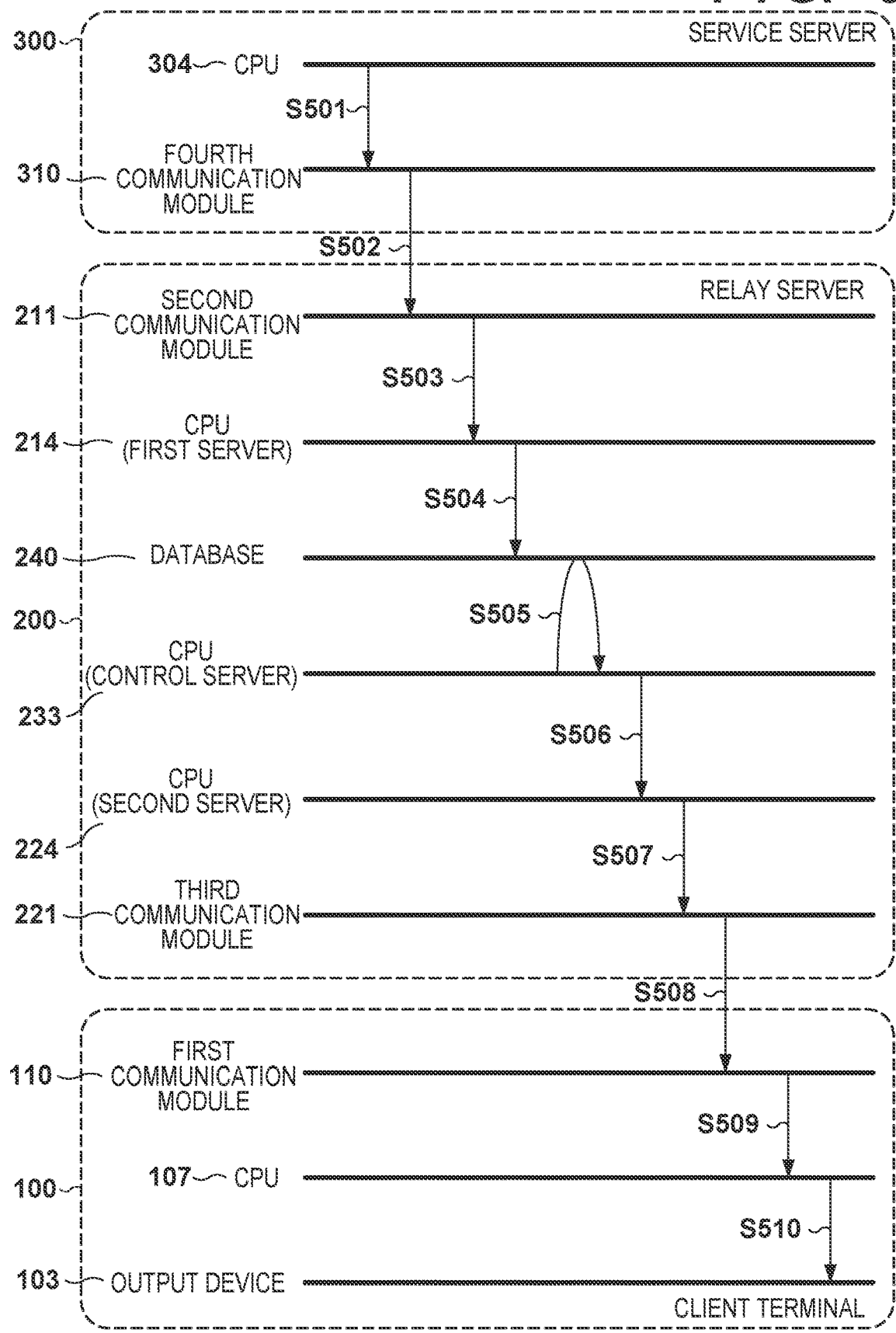
FIG. 3 is a sequence chart showing an example of the procedure of communication performed at the time of signal transmission from a service server to a client terminal via a relay server.
Figure 4:
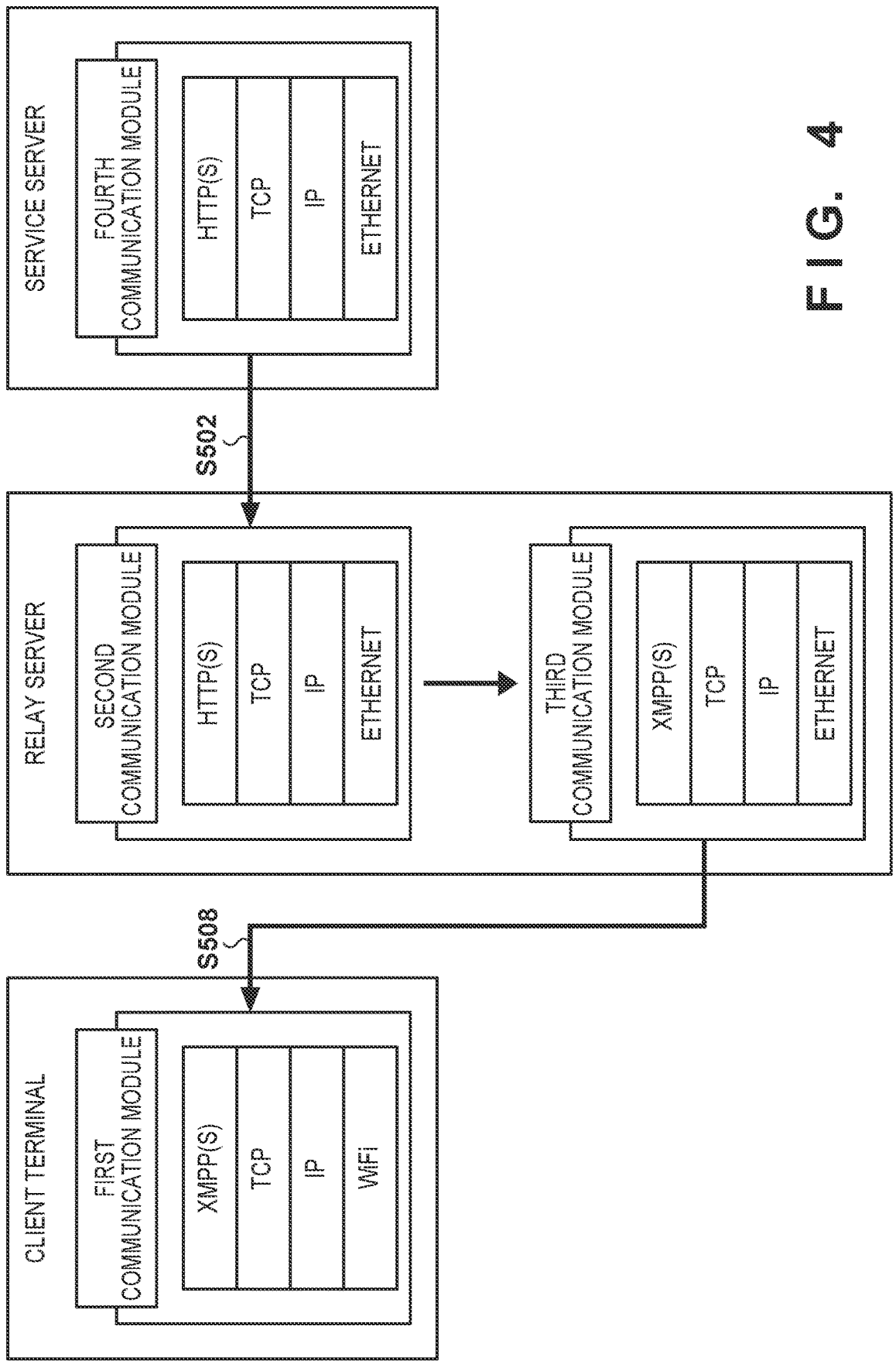
FIG. 4 is a view for schematically explaining the protocol stacks of the communication performed in FIG. 3.

FIG. 4 is a view showing the protocol stacks of the communication shown in FIG. 3. Each protocol stack of FIG. 4 shows, in order from the lowest layer, the network interface layer, the Internet layer, the transport layer, and the application layer as defined by the Internet protocol suite. As shown in FIG. 4, the fourth communication module 310 of the service server 300 includes a protocol stack composed of "Ethernet", "IP", "TCP", and "HTTP(S)" protocols. The second communication module 211 of the relay server 200 also includes a protocol stack composed of "Ethernet", "IP", "TCP", and "HTTP(S)" protocols. On the other hand, the third communication module 221 includes a protocol stack composed of "Ethernet", "IP", "TCP", and "XMPP(S)" protocols. In this manner, the application layer communication protocols are different for the segment which the relay server 200 receives from the service server 300 and the segment which the relay server 200 transmits to the client terminal 100. Note that the first communication module 110 of the client terminal 100 includes a protocol stack composed of "Ethernet", "IP", "TCP", and "XMPP(S)" protocols. Note that although the segment received by the client terminal 100 is transmitted by a protocol stack that includes "Wi-Fi" in FIG. 4, the present invention is not limited to this. That is, although the example of FIG. 4 shows a case in which the client terminal 100 preforms wireless communication by Wi-Fi, it may be set so that the client terminal 100 will also perform wired communication by "Ethernet".

Note that in FIG. 4, "Wi-Fi" is included in the protocol stack under the assumption that the client terminal 100 will receive a segment from a Wi-Fi access point (not shown) or the like. That is, the segment transmitted by the third communication module 221 is forwarded, for example, to a Wi-Fi access point by using the Ethernet. The access point then can convert the network interface layer protocol of the received segment from "Ethernet" to "Wi-Fi" and forward the segment to the client terminal 100. Note that in a case in which the client terminal 100 is to be directly connected to the relay server 200, the relay server 200 can operate in the role of receiving a Wi-Fi signal and converting the Wi-Fi signal into an Ethernet signal. That is, in such a case, the protocol stack used between the client terminal 100 and the relay server 200 will be shared as a matter of course.

An example of the procedure of communication performed when data is to be transmitted from the client terminal 100 to the service server 300 will be described next with reference to FIG. 5. Note that the processing to be described is applicable to various kinds of communications related to a service, and the data to be exchanged is not particularly limited. Hence, only the sequence of the signal will be shown in FIG. 5, and the contents of the data to be transmitted will not be shown.

More specifically, assume below that the client terminal 100 is a scanning apparatus and that the service server 300 is a server providing a storage service. An example of a case in which the user uses the client terminal 100 to scan a document, a photograph or the like and the client terminal 100 accesses the service server 300 to store the scanned document, photograph, or the like in the service server 300 will be described. Before the start of the processing of FIG. 5, a user sets, for example, a document, a photograph, or the like to be read on the client terminal 100, and the input device 102 of the client terminal 100 scans the document, the photograph, or the like to generate digitized data. The input device 102 temporarily stores the generated digital data in the RAM 106 under the control of CPU 107. The processing of FIG. 5 is started when the user makes an operation to instruct the client terminal 100 via the input device 102 to store the stored data in the service server 300.

Figure 5:
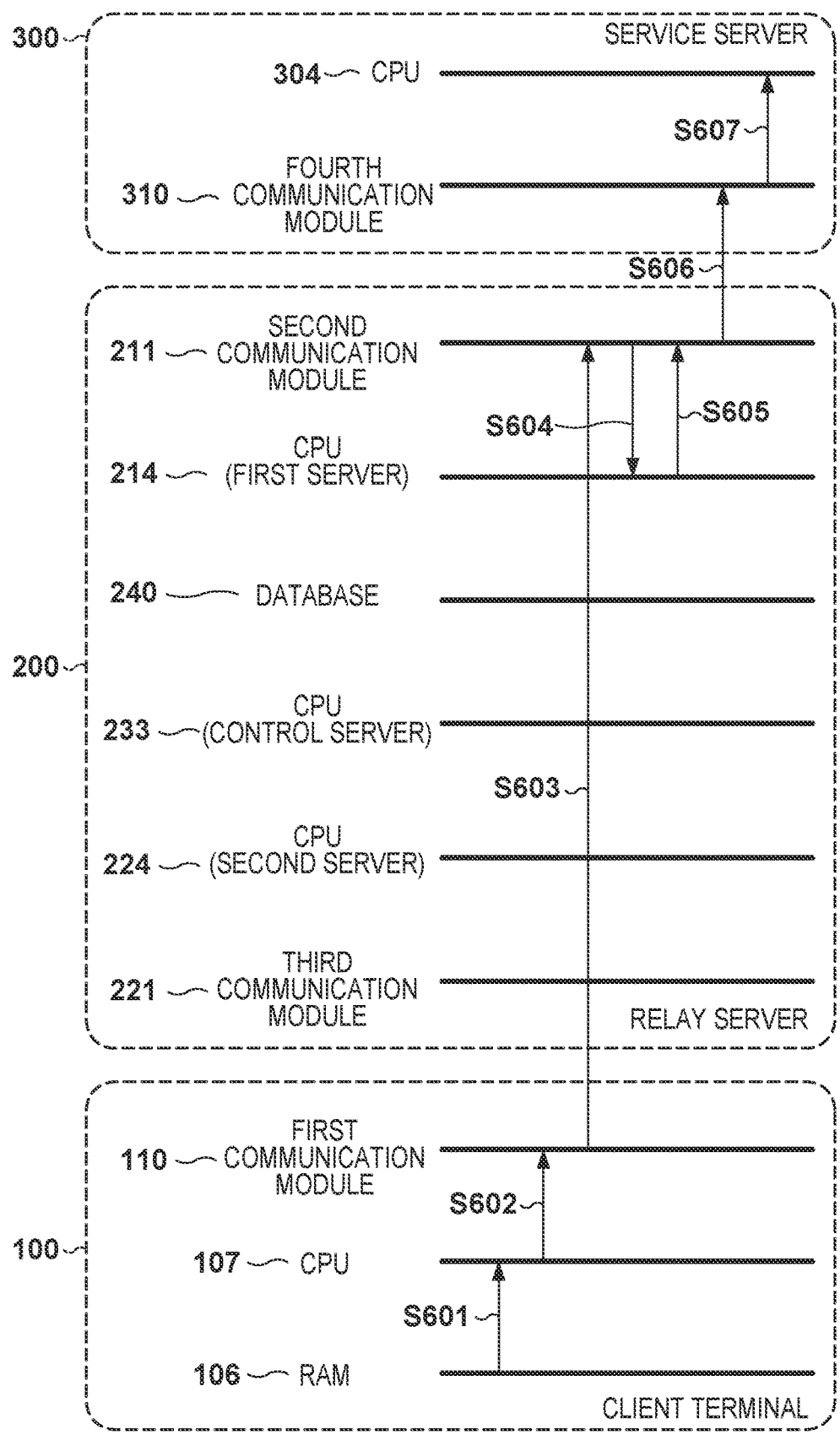
FIG. 5 is a sequence chart showing an example of the procedure of communication performed at the time of signal transmission from the client terminal to the service server via the relay server.

In the processing of FIG. 5, in response to the user instruction instructing the storage of the data stored in the RAM 106 in the service server 300, the CPU 107 reads out the data from the RAM 106 (S601). The CPU 107 generates a segment to be transmitted from the data which has been read out by adding header information corresponding to each protocol of the protocol stack in accordance with the Internet protocol suite. In this case, a segment which includes the header information of a protocol stack composed of an application layer using HTTP(S), a transport layer using TCP, an Internet layer using IP, and a network interface layer using Wi-Fi is generated. Note that, in this segment, for example, the IP address of the second communication module 211 is added as header information to the data in the IP layer. Subsequently, the CPU 107 forwards the generated segment to the first communication module 110 (S602), and the first communication module 110 transmits the segment as a wireless signal (S603). Since the IP address of the second communication module 211 has been added as the header information of the IP layer in this segment as described above, this segment is forwarded toward the second communication module 211 via, for example, the access point (not shown) which received the wireless signal.

In the first server 210, in response to the reception of the segment by the second communication module 211, the CPU 214 obtains the segment (S604) and analyzes the segment to obtain the data transmitted from the client terminal 100. Then, in order to transmit the data to the fourth communication module 310 of the service server 300, the CPU 214 generates a segment by adding appropriate header information corresponding to each protocol of the protocol stack in accordance with the Internet protocol suite. For example, the IP address of the fourth communication module 310 is added as the header information of the IP layer to the data in this segment. The CPU 214 returns the generated segment to the second communication module 211 (S605), and the second communication module 211 transmits the segment to the network 400 (S606). The segment is forwarded to the fourth communication module 310 via a router or the like in the network 400. In the service server 300, in response to the reception of the segment by the fourth communication module 310, the CPU 304 obtains the segment (S607). Subsequently, the CPU 304 analyzes the obtained segment, obtains the digital data scanned by the client terminal 100, and stores the digital data in the RAM 303 or the storage device 305.

Figure 6:
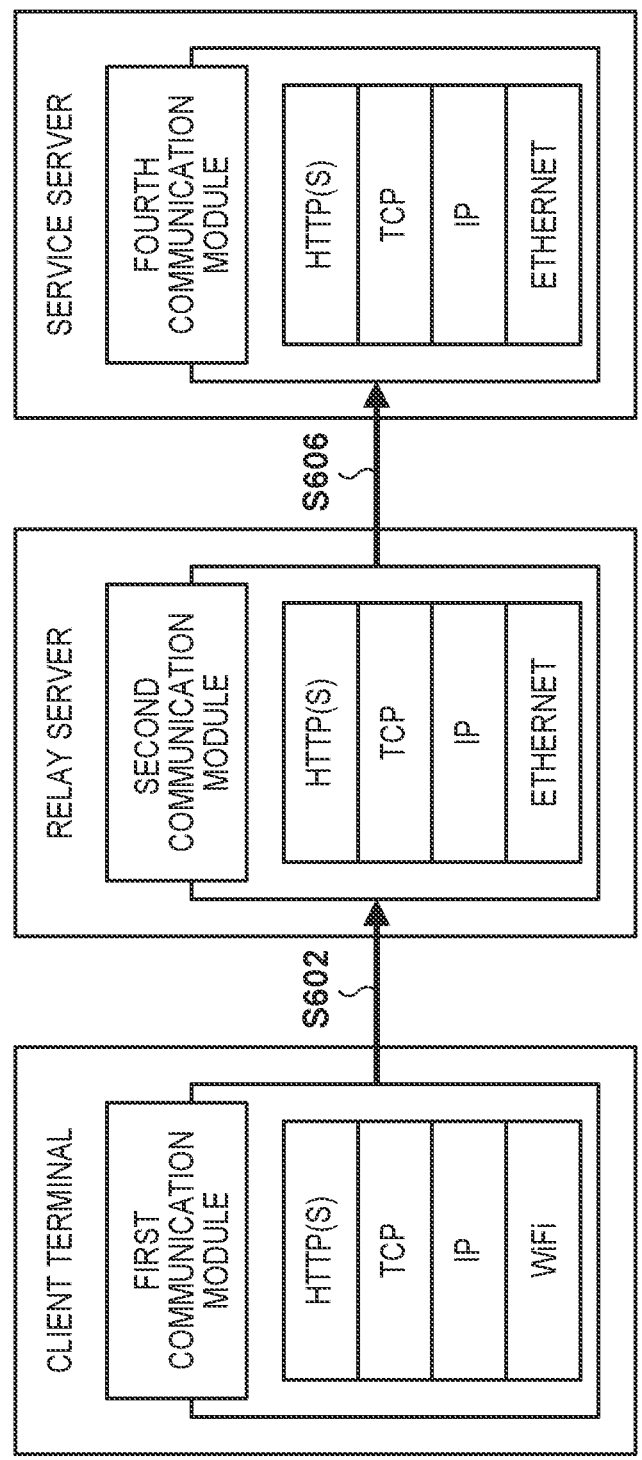
FIG. 6 is a view for schematically explaining the protocol stacks of the communication performed in FIG. 5.

FIG. 6 is a view showing the protocol stacks of the communication shown in FIG. 5. In a similar manner to FIG. 4, each protocol stack of FIG. 6 shows, in order from the lowest layer, the network interface layer, the Internet layer, the transport layer, and the application layer as defined by the Internet protocol suite. As shown in FIG. 6, the first communication module 110 of the client terminal 100 includes a protocol stack composed of "Wi-Fi", "IP", "TCP", and "HTTP(S)" protocols. The relay server 200 and the service server 300 each include a protocol stack composed of "Ethernet", "IP", "TCP", and "HTTP(S)" protocols. As it can be seen from the application layers shown in FIG. 6, HTTP(S) is used in both the transmission of data from the client terminal 100 to the relay server 200 and the transmission of data from the relay server 200 to the service server 300.

Although the above embodiment described a case in which the client terminal 100 is the printing apparatus or the scanning apparatus, the present invention is not limited to this. That is, as long as the client terminal 100 is arranged so as to transmit or receive some kind of data via the relay server 200, it need not be a printing apparatus or a scanning apparatus. In a similar manner, the service server 300 can also provide a service other than a storage service. The relay server 200 is not limited to the above-described arrangement and operations either.

In this embodiment, as described above, in the communication performed between the client terminal 100, the relay server 200, and the service server 300, different communication protocols are used for transmission and for reception in the application layer defined by the Internet protocol suite. As a result, for example, even if there is a rapid increase in the number of client terminals 100 to be connected to the relay server 200 by using HTTP(S), stable communication can be implemented by suppressing the load of the XMPP server (the second server 220).

[Modification]

In the example of the procedure of communication described above, an example of push communication in which the relay server 200 forwards, when data is received from the client terminal 100, the data to the service server 300 without receiving a data obtainment request from the service server 300. On the other hand, the relay server 200 can also perform pull communication in which it transmits, in response to receiving a data obtainment request from the service server 300, the data received from the client terminal 100 as a response to the request. This modification will describe an example of a case in which this pull communication is performed.

Note that this kind of pull communication is effective in, for example, a case in which the data stored in the relay server 200 is frequently changed. That is, if push communication is performed in such case, the relay server 200 will have to transmit the changed data to the client terminal 100 or the service server 300 each time the data is changed. On the other hand, if communication is performed according to pull communication, the relay server 200 will not transmit data unless there is a data obtainment request from the client terminal 100 or the service server 300 even if the data is changed. Hence, the processing load of the relay server 200 can be reduced by performing pull communication. In addition, by reducing the processing load of the relay server 200, it is possible to increase the durability of the relay server 200 to a case in which the number of the client terminals 100 or the number of the service servers 300 has rapidly increased.

Figure 7:
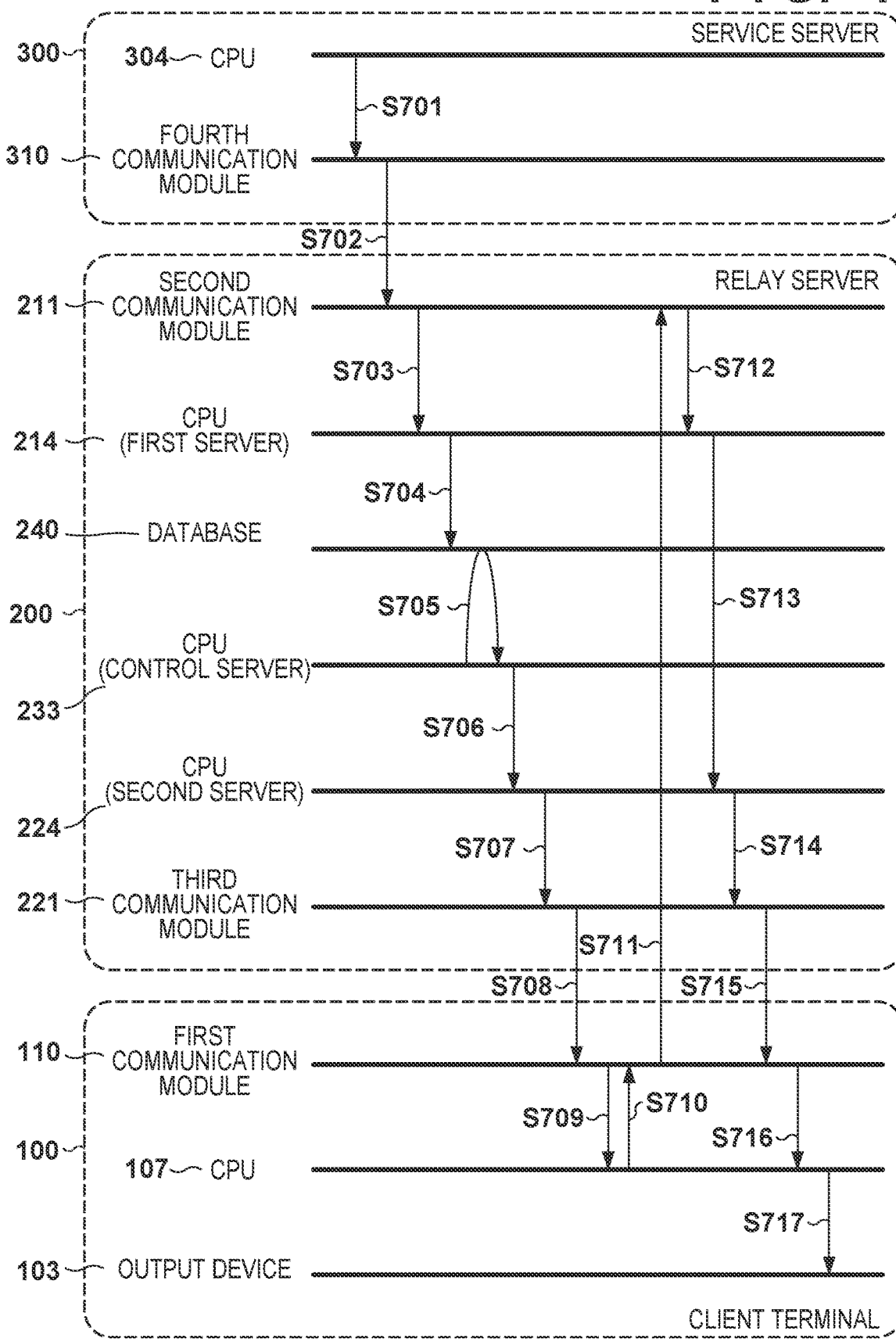
FIG. 7 is a sequence chart showing an example of the procedure of processing at the time of signal transmission from the service server to the client terminal via the relay server.

First, an example in which the relay server 200 obtains information from the service server 300 by push communication and subsequently provides information to the client terminal 100 by pull communication will be described below. FIG. 7 shows an example of the procedure of communication in this case. In this processing, in response to the storage of the data received from the service server 300 in the database 240, the relay server 200 will notify the client terminal 100 of the data storage by push communication. Subsequently, for example, in response to a predetermined operation made by the user, the client terminal 100 transmits a data obtainment request to the relay server 200. In response to the data obtainment request, the relay server 200 transmits the data stored in the database 240 to the client terminal 100.

Figure 8:
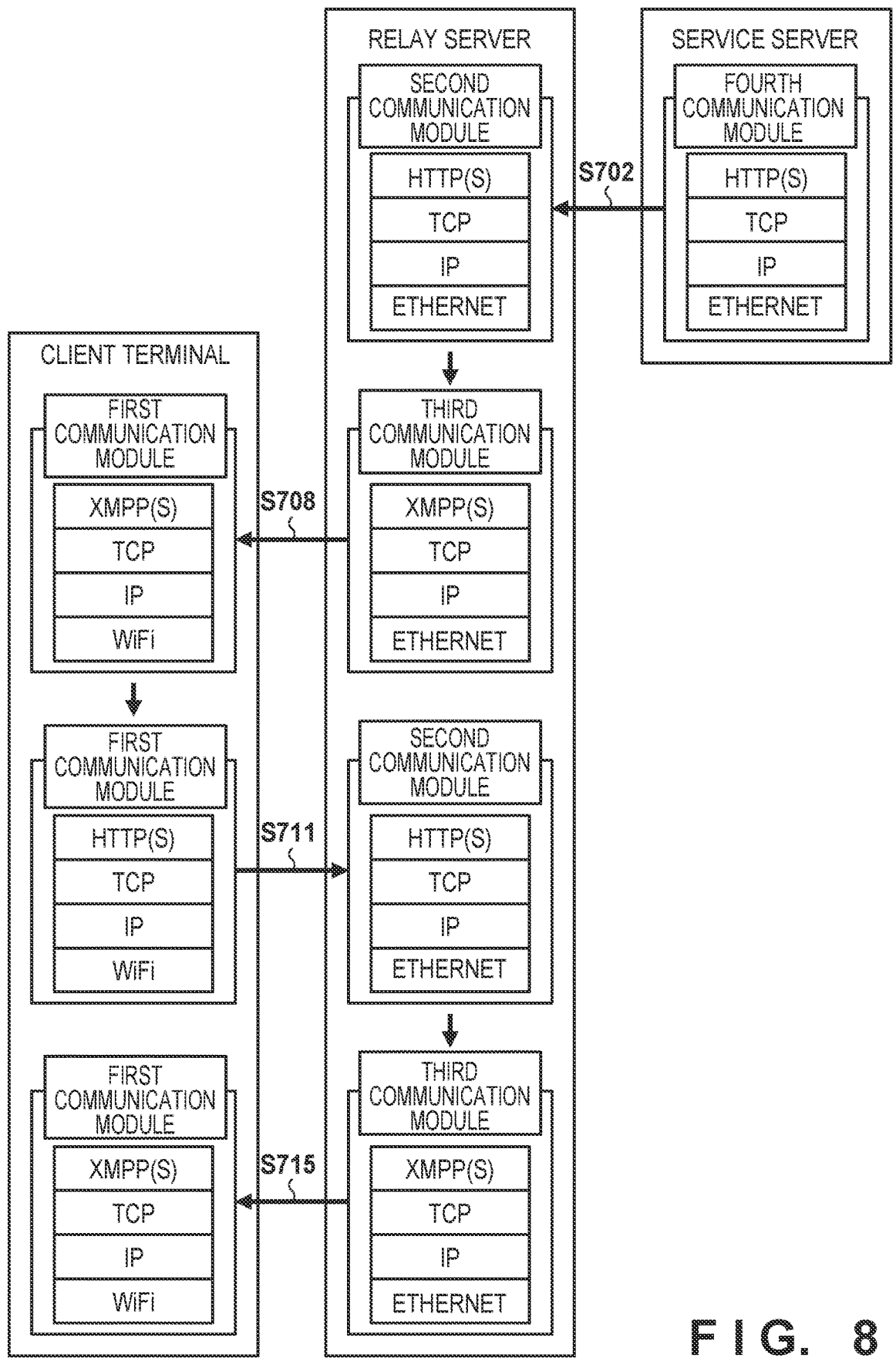
FIG. 8 is a view for schematically explaining the protocol stacks of the communication performed in FIG. 7.

Note that the processing shown in FIG. 7 is processing executed in a use case similar to the case of FIG. 3. For example, the processing as shown in FIG. 7 is executed in a case in which a document, a photograph, or the like stored in the service server 300 is to be printed by the client terminal 100. Note that FIG. 8 shows the protocol stacks of the communication performed when the processing of FIG. 7 is to be executed. As shown in FIG. 8, as the communication protocol of the application layer to be used, HTTP is used for communication between the service server 300 and the relay server 200. XMPP is used for the push notification from the relay server 200 to the client terminal 100, and HTTP is used for the information request from the client terminal 100 to the relay server 200. That is, as described above, in the communication between the client terminal 100 and the relay server 200, different communication protocols are used for a case in which the client terminal 100 is the transmitting side and for a case in which the client terminal 100 is the receiving side.

Since the processes (S701 to S705) performed from the data transmission by the service server 300 to the detection of data storage in the database 240 by the control server 230 in the relay server 200 are similar to the processes of S501 to S505 of FIG. 3, a description will be omitted. When it is detected that the data addressed to the client terminal 100 has been stored, the CPU 233 of the control server 230 instructs the CPU 224 of the second server 220 to generate a segment to notify the client terminal 100 of the storage of the data (S706). The CPU 224 forwards the generated segment to the third communication module 221 (S707), and the third communication module 221 performs push transmission of the segment addressed to the client terminal 100 (S708). The push notification using the XMPP protocol here suffices to notify the client terminal 100 of the presence of the data to be obtained in the relay server 200. Hence, other than the header required for XMPP, the push notification transmitted in this case includes a small amount of information of about 1 byte to 10 kilobytes.

Upon detecting that the first communication module 110 has received the segment, the CPU 107 of the client terminal 100 obtains the segment (S709) and analyzes the contents. The CPU 107 will recognize, based on the information in the segment, that data addressed to the client terminal 100 is stored in the database 240, and determine whether to obtain this data. For example, the CPU 107 will notify the user of the presence of printing target data in the relay server 200, and the user can determine whether to obtain the data in response to receiving an instruction indicating the obtainment of the data. If it is determined that the data is to be obtained, the CPU 107 generates a segment including a data obtainment request and forwards the generated segment to the first communication module 110 (S710). The first communication module 110 forwards the segment addressed to the second communication module 211 (S711). Upon detecting that the second communication module 211 has received the segment, the CPU 214 of the first server 210 obtains and analyzes the segment and recognizes that a data obtainment request has been received (S712). The CPU 214 will notify the CPU 224 of the second server 220 of the data obtainment request (S713). Upon receiving this notification, the CPU 224 will retrieve the data addressed to the client terminal 100 stored in, for example, the RAM 223 or the database 240, generate a segment addressed to the client terminal 100, and forward the generated segment to the third communication module 221 (S714). The third communication module 221 forwards the received segment to the client terminal 100 (S715). Upon detecting that the first communication module 110 has received the segment, the CPU 107 of the client terminal 100 obtains and analyzes the segment (S716). The subsequent process (S717) is the same as the process of S510 of FIG. 3.

In this manner, although every data addressed to the client terminal 100 needs to be transmitted by the XMPP protocol in push communication, only the data storage notification and the data of the data transmission request are transmitted by the XMPP protocol in this modification. Hence, in a case in which only some sets of data are to be loaded to the client terminal 100 when the data stored in the database 240 is frequently updated, it is possible to greatly reduce the amount of data to be transmitted by XMPP and greatly reduce the load of the XMPP server.

Figure 9:
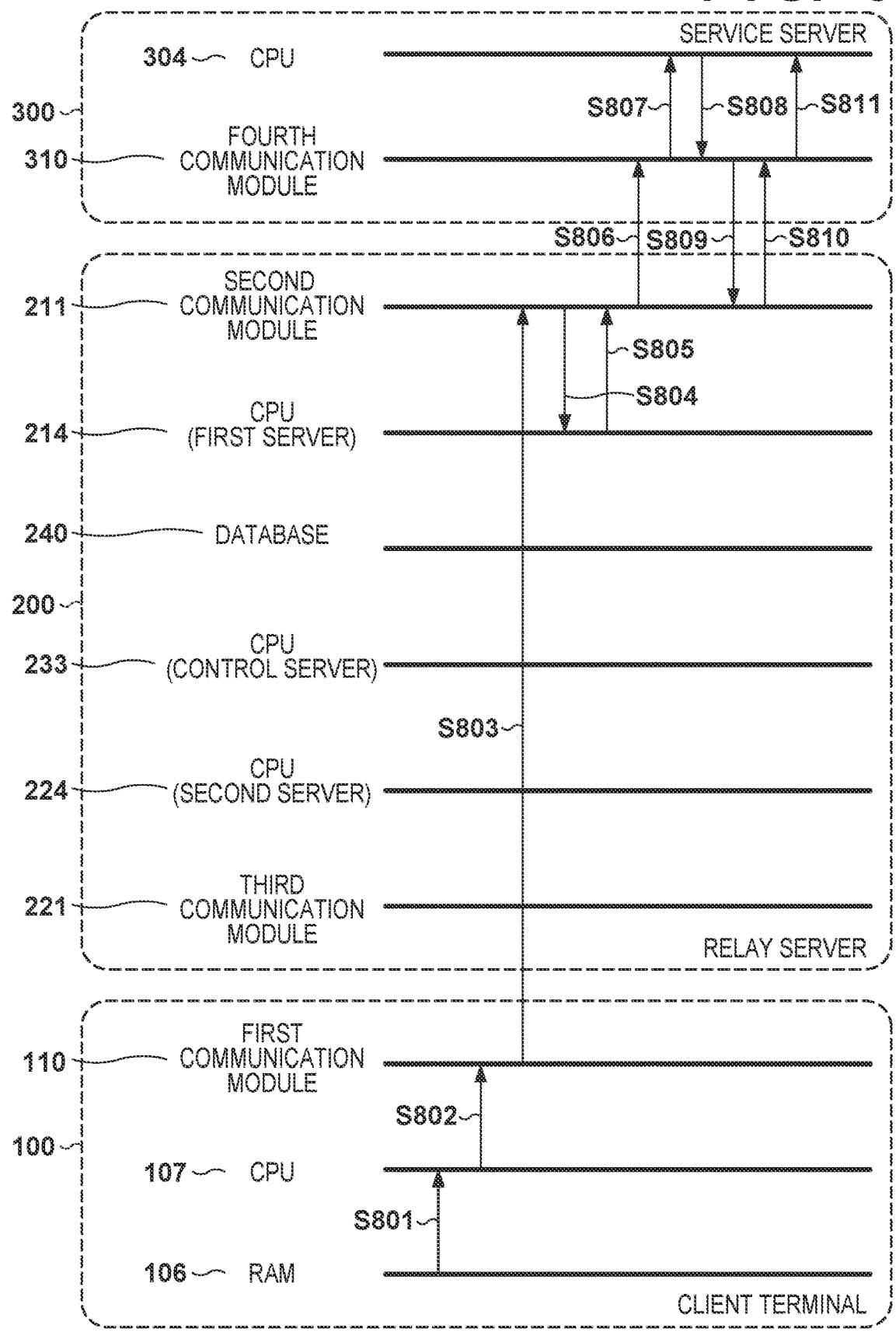
FIG. 9 is a sequence chart showing an example of the procedure of communication performed at the time of signal transmission from the client terminal to the service server via the relay server.

An example in which the relay server 200 obtains information from the client terminal 100 by push communication and provides information to the service server 300 by pull communication will be described next. FIG. 9 shows an example of the procedure of the communication performed in this case. In this processing, in response to receiving data from the client terminal 100, the relay server 200 will notify the service server 300 of the storage of the data by performing push communication. Subsequently, when a data obtainment request is received from the service server 300, the relay server 200 will transmit the data temporarily stored in the RAM 213 or the like to the service server 300. Note that the service server 300 can transmit the data obtainment request to the relay server 200 in response to, for example, the load of the self-apparatus or the load of the line between the self-apparatus and the relay server 200 which has become a predetermined value or less.

Note that the processing shown in FIG. 9 is processing executed in a use case similar to the case of FIG. 5. For example, the processing as shown in FIG. 9 is executed in a case in which the client terminal 100 is to store a scanned image in the service server 300. Note that FIG. 10 shows protocol stacks of communication performed when the processing of FIG. 9 is to be executed. As shown in FIG. 10, as the communication protocol of the application layer to be used, HTTP is used for the signal transmission from the client terminal 100 to the relay server 200 and for the communication between the relay server 200 and the service server 300.

Since processes (S801 to S804) performed from when a segment is transmitted from the client terminal 100 until the CPU 214 obtains the data by receiving and analyzing the segment of the CPU 214 of the first server 210 are similar to the processes of S601 to S604 of FIG. 5, a description will be omitted. The CPU 214 stores the data obtained by the analysis in, for example, the RAM 213, generates a segment that includes information indicating the storage of the data, and transmits the generated segment to the service server 300 via the second communication module 211 (S805 and S806). In this case, the information transmitted from the second communication module 211 to the fourth communication module 310 is a push notification. This push notification suffices to notify the service server 300 of the fact that the information transmitted from the client terminal 100 is stored in the relay server 200. Hence, other than the header required for the HTTP protocol, the push notification here includes a small amount of information of about 1 byte to 10 kilobytes. The push notification is detected by the CPU 304 of the service server 300 (S807). Subsequently, in response to this push notification, the CPU 304 generates an HTTP request to the relay server 200 in accordance with the result of determining whether the self-apparatus is in a state that can obtain the data based on the load of the self-apparatus or the like as needed. The generated HTTP request is forwarded from the CPU 304 to the fourth communication module 310 (S808), and the HTTP request is transmitted from the fourth communication module 310 to the second communication module 211 (S809). By transmitting this HTTP request, the service server 300 obtains, via the second communication module 211, the data stored temporarily in, for example, the RAM 213 of the first server 210 (S810 and S811). As a result, the service server 300 can obtain and process the request from the client terminal 100.

This modification showed an example in which the relay server 200 transmits a push notification to the client terminal 100 in response to receiving a request from the service server 300. However, the present invention is not limited to this. For example, the relay server 200 need not perform the push notification after it receives information from the service server 300. In this case, the client terminal 100 can transmit an information obtainment request to the relay server 200 periodically or in response to a user operation. Then the relay server 200 may determine, in response to the request, whether information addressed to the client terminal 100 is stored in the self-apparatus, and transmit information indicating the result of this determination to the client terminal 100. In a similar manner, this modification showed an example in which the relay server 200 transmits a push notification to the service server 300 in response to receiving a request from the client terminal 100. However, the present invention is not limited to this. For example, the relay server 200 need not transmit a push notification after receiving information from the client terminal 100. In this case, for example, the service server 300 can periodically transmit an information obtainment request to the relay server 200. Subsequently, in response to this request, the relay server 200 can determine whether information addressed to the service server 300 is stored in the self-apparatus and transmit information indicating the result of this determination to the service server 300.

By setting so that a signal, which has a small data size enough only for the signal to indicate the storage of data in the relay server 200, will be transmitted in the manner of this modification, it is possible to suppress the increase of the load due to an increase in the number of the client terminals 100 or the number of service servers 300. In addition, by setting so that a partner apparatus is notified of the fact that the relay server 200 is storing information, a service server which provides a new service or various kinds of client terminals 100 can be supported without updating the control program of the relay server 200.

(Client Terminal and Service Association Processing)

Processing for storing the correspondence relationship between the client terminal 100 and each service in the relay server 200 and determining whether the service server 300 is to provide the service to the client terminal 100 based on this relationship will be described hereinafter. In this processing, the client terminal 100 registers identification information (terminal ID) unique to the client terminal 100 in the database 240 of the relay server 200 and completes the preparation for the client terminal 100 to receive the service. Note that the terminal ID can be, for example, a serial number which is a unique ID added to the client terminal 100 in its manufacturing process, a MAC address added to the first communication module 110, or the like. On the other hand, the service server 300 registers identity information (service ID) unique to the service that the self-apparatus provides and the terminal ID which is to receive the service in the database 240. It is set so that the client terminal 100 will be able to receive a service from the service server 300 after such pieces of information are registered. Note that this processing can be executed in addition to the communication processing described above or in a case in which the communication processing described above is not used.

Figure 11A:
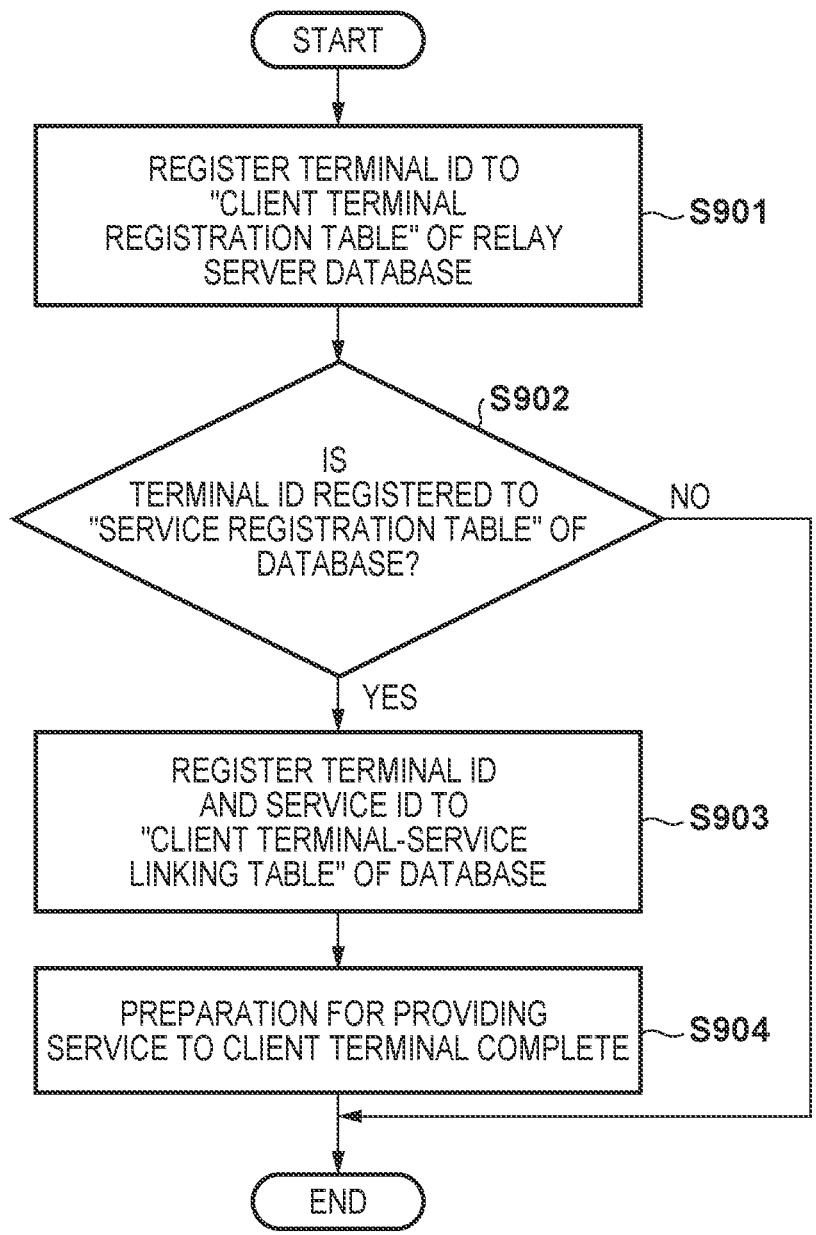
FIGS. 11A and 11B are flowcharts showing an example of the procedure of information registration processing.

Information registration processing (client terminal 100 and service association processing) performed in such processing will be described hereinafter. FIG. 11A shows an example of the procedure of processing performed from when the terminal ID of the client terminal 100 is registered by the client terminal 100 in the database 240 of the relay server 200 until the preparation of the client terminal 100 to receive a service is completed. In addition, FIG. 11B shows an example of the procedure of processing from when the identity information (service ID) unique to a service and the terminal ID which is to receive the service are registered by the service server 300 in the database 240 until the preparation of the client terminal 100 to receive the service is completed.

FIG. 12 shows an example of information associating each terminal ID with each service ID stored in the database 240. This information includes, as shown in FIG. 12, a service master table 1001, a service registration table 1002, a client terminal registration table 1003, and a client terminal-service linking table 1004. Each table includes, as a unique key, a unique character string (UUID [universally unique ID]) which is generated at the registration of each record and has no possibility of overlap. In addition to the UUID as a unique key, the service master table 1001 includes, as attribute values, the service ID and the registration date and time of the registration of the service. In addition to the UUID, the service registration table 1002 includes, as attribute values, the service ID, the terminal ID, and the registration date and time. In addition to the UUID, the client terminal registration table 1003 includes the terminal ID, the terminal information describing the detailed information of the terminal, and the registration date and time. The client terminal-service linking table 1004 includes, in addition to the UUID, the terminal ID, the service ID, and the registration date and time.

In FIG. 11A, the client terminal 100 accepts a user operation via the input device 102 and transmits, to the relay server 200, a request to register a terminal ID and terminal information to the client terminal registration table 1003 (step S901). The communication from the client terminal 100 to the relay server 200 here may be performed by using HTTP or by using XMPP as described above. In addition, push communication in which information is transmitted to the relay server 200 without a data obtainment request being received by the client terminal 100 may be performed or a pull communication in which the client terminal 100 transmits information in response to a request from the relay server 200 may be performed. Upon receiving a request from the client terminal 100, the relay server 200 generates a UUID and registers, as attribute values, the terminal ID, the terminal information, and the registration date and time in association with the value of the UUID as a unique key. Note that the relay server 200 can check whether a record including the terminal ID that is notified by the request is already generated and registered in the client terminal registration table 1003. If the notified terminal ID is already registered in the client terminal registration table 1003, the relay server 200 can transmit, to the client terminal 100, information indicating that the terminal ID is already registered. Subsequently, the relay server 200 scans the service registration table 1002 to determine whether there is a record including this terminal ID as an attribute value (step S902). If there is a record including this terminal ID as an attribute (YES in step S902), the relay server 200 will register the service ID and the terminal ID, which are included in the record, in the client terminal-service linking table 1004 (step S903). The client terminal 100 completes the preparation to receive the service provided by the service server 300 by this association (step S904). Note that if there is no record including the terminal ID as an attribute value (NO in step S902), the relay server 200 will end the processing of FIG. 11A. In this case, the relay server will need to wait for the service ID registration processing, as shown in FIG. 11B, from the service server 300 to be executed.

Figure 11B:
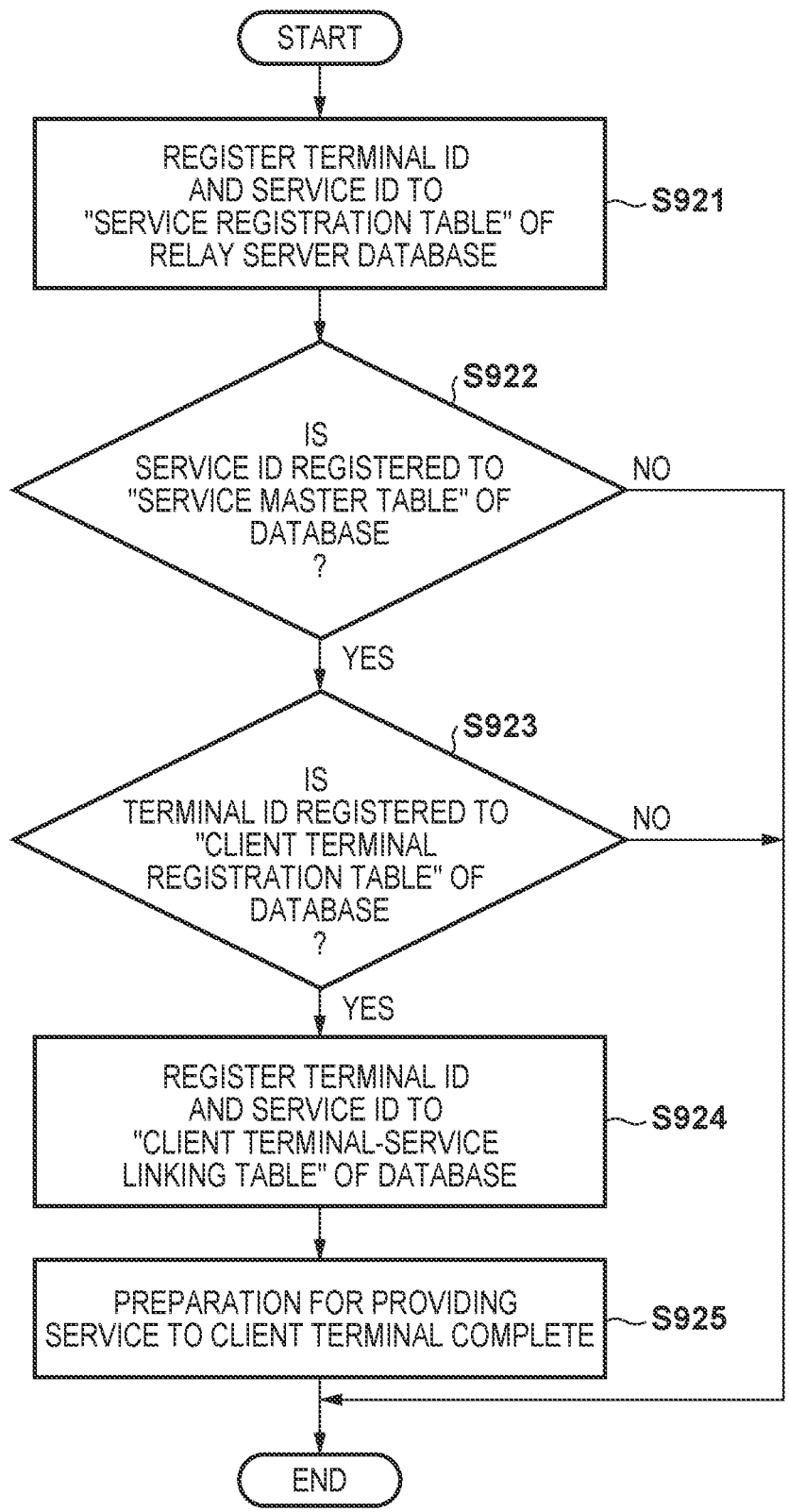

The processing of FIG. 11B is started by the service server 300 based on, for example, an operation made on a personal computer (not shown) or the like by the user. When this processing is started, the service server 300 transmits a request to the relay server 200 to register the service registered in the service registration table 1002 and the terminal ID which is to receive the service (step S921). Upon receiving the request, the relay server 200 confirms whether the service ID included in the request is registered in the service master table 1001 (step S922). If the service ID included in the request is registered in the service master table 1001 (YES in step S922), the process advances to step S923. In step S923, the relay server 200 confirms whether there is a record including the terminal ID, which is indicated in the request, in the client terminal registration table 1003 (step S923). If there is such a record in the client terminal registration table 1003 (YES in step S923), the relay server 200 registers the service ID and the terminal ID in the client terminal-service linking table 1004 (step S924). The client terminal 100 completes the preparation to receive the service provided from the service server 300 by this association (step S925). Note that if the service ID is not registered in the service master table 1001 (NO in step S922) or if there is no record including the terminal ID in the client terminal registration table 1003 (NO in step S923), the processing ends. In this case, the relay server will need to wait for the registration processing of the terminal ID of the client terminal 100 to be executed as shown in FIG. 11A.

As a result, the correspondence relationship between the client terminal 100 and the service provided by the service server 300 is registered, and it is possible to prevent the service from being provided to another client terminal 100 that has not been registered. Note that in a case in which the client terminal 100 is to be assigned to another person or the like, the terminal ID can be deleted from the client terminal registration table 1003. In this case, the association is completely canceled by deleting the record which includes the terminal ID as an attribute value from the client terminal-service linking table 1004 and by deleting the record including the terminal ID in the service registration table 1002. Also, in a case in which a service is deleted from the service master table 1001, the record which includes, as an attribute value, the service ID corresponding to the service can be deleted in the service registration table 1002. The record including the service ID can also be deleted from the client terminal-service linking table 1004. As a result, it is possible to prevent, in a case in which the service ID is assigned to another service, the other service from being provided to a client terminal which is not supposed to actually receive the service.

In this processing, the registration of the client terminal 100 and the registration of the service are performed separately with respect to the relay server 200 as a center, and the service is provided after the association between the client terminal and the service is confirmed. According to this arrangement, for example, in a case in which a new service server 300 is to be added in an already-existing system to add a new service, the new service is added to the service master table 1001. Subsequently, the terminal which is to receive the provision of the new service is registered in the service registration table 1002. In this manner, by arranging so that the addition of a new service is managed by the service master table 1001, it becomes easy to support the expansion of service servers that provide new services and eliminates the need to greatly change the contents of the processing of the relay server 200. In addition, since there are no great changes in the processing contents, the load of the relay server 200 will not greatly increase, and it will be possible to prevent the arrangement from being changed excessively to improve the arithmetic processing capability.

(Signal Transmission Processing Based on Session Establishment State)

An example of processing for transmitting information performed after the relay server 200 confirms the presence/absence of the communication protocol session to be used when the relay server 200 is to transmit information to the client terminal 100 will be described. Also, an example of processing performed to establish a session from the client terminal 100 in a case in which the communication protocol session has not been established and information cannot be transmitted from the relay server 200 to the client terminal 100 will be described. In a similar manner to the examples described above, assume that the communication protocol used to transmit a signal from the relay server 200 to the client terminal 100 is XMPP. Note that this processing can also be executed in addition to the processing operations described above or in a case in which the processing operations described above are not used.

Figure 13:
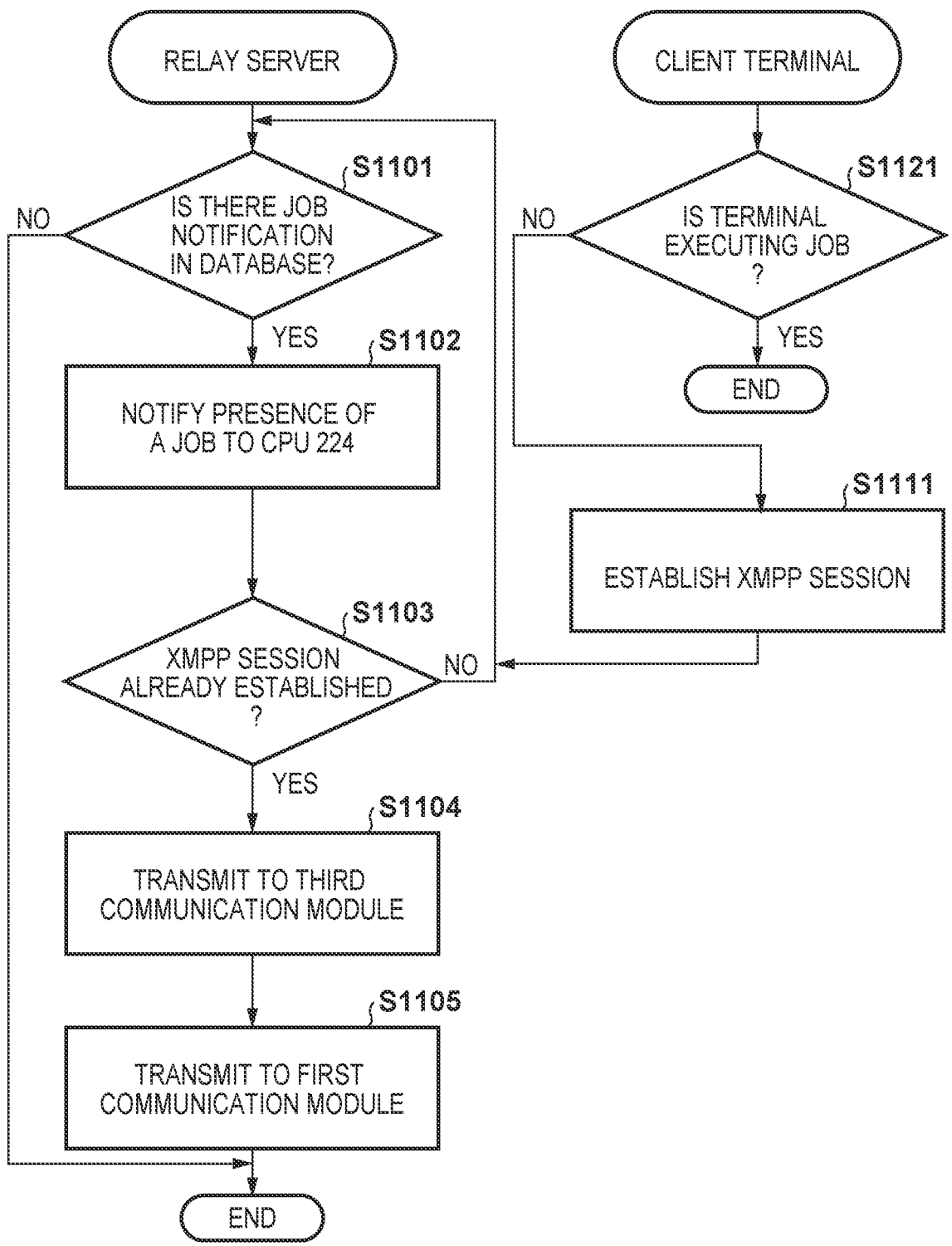
FIG. 13 is a flowchart showing an example of the procedure of processing to perform communication after a communication session is established between the client terminal and the relay server.

FIG. 13 is a flowchart showing the details of an example of the procedure of processing performed from step S505 to step S508 in FIG. 3. Upon confirming that there is a job notification in the database 240 (YES in step S1101), the relay server 200 notifies the CPU 224 of the second server 220 of the presence of the job (step S1102). Subsequently, the CPU 224 determines whether an XMPP session has been established with the client terminal 100 (step S1103). If it is determined that the XMPP session has been established (YES in step S1103), the CPU 224 transmits information to the first communication module 110 of the client terminal 100 via the third communication module 221 (steps S1104 and S1105). On the other hand, if the XMPP session has not been established (NO in step S1103), the relay server 200 suspends the transmission of the information and continues to monitor whether a job is present. For example, an expiration date can be set to a job, and the job can be deleted when this expiration date has expired. However, in this case, the load of the database 240 can increase because the CPU 224 will be connected to the database 240 constantly until the expiration date of the job. Hence, in a case in which the client terminal 100 is not executing an expected job (NO in step S1121), the user operating the client terminal 100 can cause the client terminal 100 to execute processing to establish an XMPP session with the relay server 200 (step S1111). For example, the user can cause the XMPP session establishment processing to be executed by operating the client terminal 100 to enable the XMPP session establishment function provided in the client terminal 100 in advance. If it is determined that the XMPP session has not been established, the relay server 200 need not subsequently perform the job confirmation and can determine whether there is an unexpired job at the point when the XMPP session is established with the client terminal 100. This can reduce the load of the database 240. Note that the XMPP session establishment function can be used, for example, when the second server 220 is newly installed or the like.

By confirming the establishment of a session in advance when information is to be transmitted from the relay server 200 to the client terminal 100 in the manner of this processing, it is possible prevent data transmission processing from being performed even though a session has not been established. In addition, it is possible to prevent unnecessary access to the database 240 in the relay server 200 when the client terminal 100 has a session establishment function. Also, fewer jobs will be accumulated in the relay server 200 because a session will be established earlier under the initiative of the client terminal 100. As a result, the load of the relay server 200 can be reduced, and the client terminal 100 can execute a job at an earlier point.

(Another Arrangement Example)

It can be arranged so that the relay server 200 will monitor the state of the system and select a communication protocol corresponding to the state. The relay server 200 can change the communication protocol in accordance with the state by monitoring the communication traffic of the overall system, whether the push communication or the pull communication is being used, and the state of the load of each server. In addition, the relay server 200 can dynamically select the communication protocol to be used in accordance with the characteristics of each communication protocol.

Figure 14:
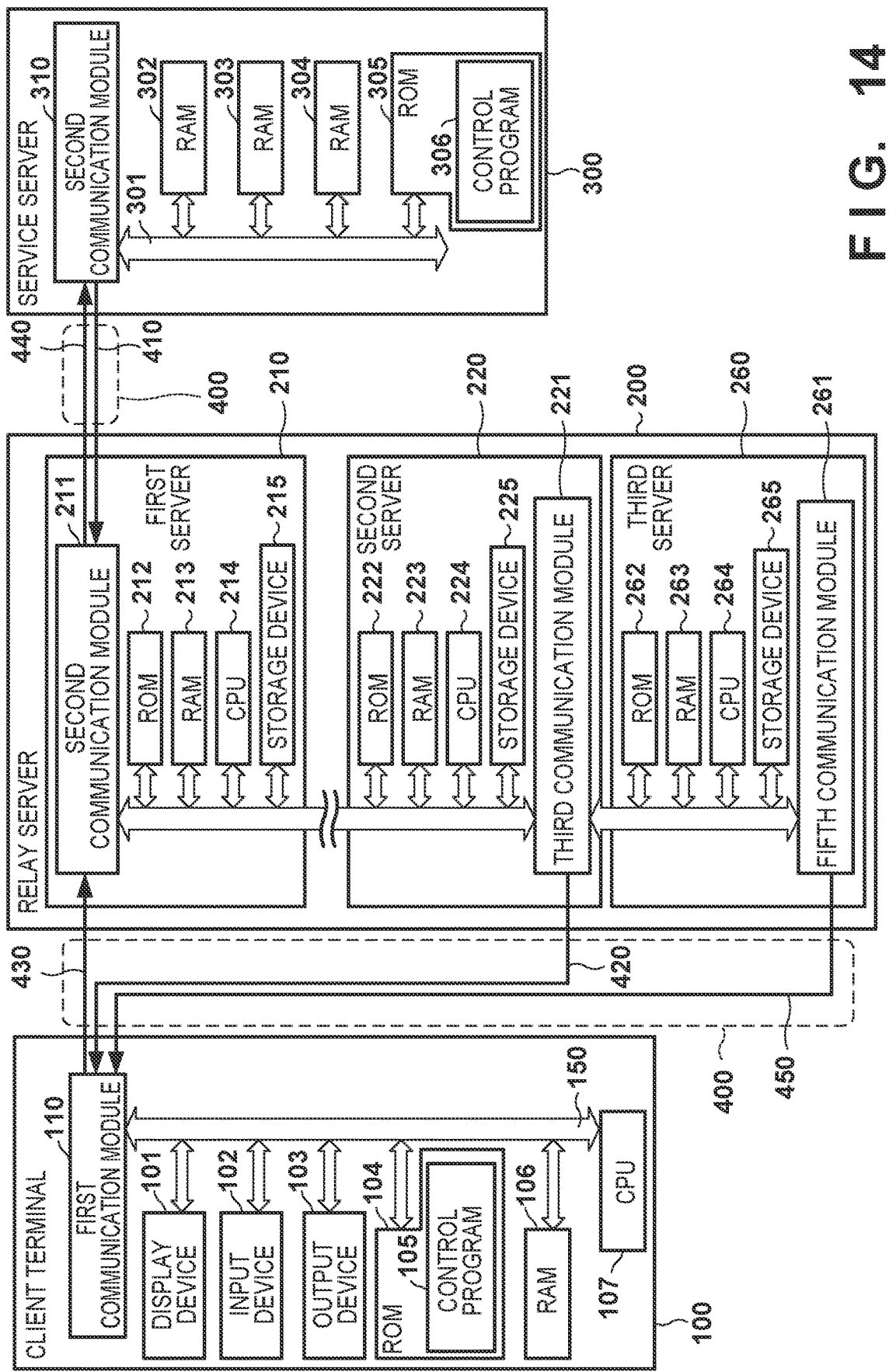
FIG. 14 is a block diagram showing an example of another arrangement of the information processing system.

In this example, as shown in FIG. 14, the relay server 200 further includes, in addition to the second server 220 which uses XMPP as the communication protocol, a third server 260 which uses MQTT as the communication protocol. In a similar manner to the second server 220, the third server 260 is formed by a fifth communication module 261, a ROM 262, a RAM 263, a CPU 264, and a storage device 265. For example, while using the XMPP server (the second server 220) to transmit a push notification to the client terminal 100, the relay server 200 monitors the load of the XMPP server. If the load is, for example, large enough to exceed a predetermined value, the relay server 200 can transmit the push notification to the client terminal 100 by executing MQTT communication via an MQTT server (the third server 260). As a result, the relay server 200 will be able to distribute the load and operate the system stably. In this case, the push notification executed for notification may or may not be encrypted.

In addition, the relay server 200 may select the communication protocol in accordance with the characteristics of each communication protocol. For example, in general, the XMPP protocol has a large overhead at the time of communication and tends to have a large transmission capacity while the MQTT protocol has a small overhead and allows the transmission capacity to be suppressed. On the other hand, the XMPP protocol has strong security as its characteristic. Hence, it may be set so that in a case in which only the push notification with a low level of confidentiality is performed, the relay server 200 will not perform encryption and use the MQTT protocol which has a small capacity, and in a case in which communication with a high-level of confidentiality needs to be performed, the relay server 200 will select the XMPP protocol. In this manner, the relay server 200 can select the communication protocol to be used based on the characteristics (capacity, confidentiality, and the like) of the transmission-target data.

As described above, the relay server 200 can flexibly and dynamically change the communication protocol to be used, in accordance with the state, when information is to be transmitted to the client terminal 100. As a result, the information processing system can flexibly cope with an increase in the numbers of the client terminals 100 and the numbers of the service servers 300 and apply information security techniques appropriately.

Note that although it was assumed that the second communication module 211 will commonly use HTTP to receive a signal from the client terminal 100 and to communicate with the service server 300 in the embodiment described above, the present invention is not limited to this. For example, the second communication module 211 may use a first protocol to receive the signal from the client terminal 100 and use a second communication protocol for the communication with the service server 300. In addition, different communication protocols may be used in the signal transmission to the service server 300 and in the signal transmission from the service server 300.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-144025, filed Jul. 31, 2018 which is hereby incorporated by reference herein in its entirety.

What is claimed is:

1. A relay apparatus that relays communication between a server which provides a service and a terminal which receives the service, comprising:
    at least one processor; and
    at least one memory coupled to the at least one processor, wherein the at least one memory stores a computer-readable instruction that causes, when executed by the at least one processor, the relay apparatus to
    execute a first communication to transmit a predetermined signal to the terminal in accordance with a first communication protocol, and
    execute a second communication to receive a response to the predetermined signal by the first communication from the terminal in accordance with a second communication protocol different from the first communication protocol and without using the first communication protocol, and
    execute a third communication to communicate with the server based on the reception of the response.

2. The apparatus according to claim 1, comprising:
    a first server that executes the first communication; and
    a second server that is different from the first server and that executes the third communication.

3. The apparatus according to claim 1, wherein the second communication protocol is used in the communication with the server in the third communication.

4. The apparatus according to claim 1, wherein in a case in which data addressed to the terminal from the server is received by a fourth communication, the relay apparatus transmits the data to the terminal by the first communication without receiving a request from the terminal.

5. The apparatus according to claim 1, wherein in a case in which data addressed to the terminal from the server is received by a fourth communication, the relay apparatus transmits the data to the terminal by the first communication in response to receiving a request from the terminal.

6. The apparatus according to claim 1, wherein in a case in which data addressed to the server is received from the terminal, the relay apparatus transmits the data to the server by the third communication without receiving a request from the server.

7. The apparatus according to claim 1, wherein in a case in which data addressed to the server from the terminal is received, the relay apparatus transmits the data by the third communication in response to receiving a request from the server.

8. The apparatus according to claim 1, wherein the relay apparatus stores a first table including information indicating the terminal, a second table including information indicating a service to be provided by the server and information indicating the terminal which is to receive the service, and a third table associating the first table and the second table.

9. The apparatus according to claim 8, wherein the relay apparatus registers the information of the terminal in the first table before the terminal receives the service.

10. The apparatus according to claim 8, wherein the relay apparatus registers the information of the service and the information of the terminal which is to receive the service before the server provides the service to the terminal.

11. The apparatus according to claim 8, wherein in a case in which the information of the terminal to be registered in the first table is already registered in the second table before the terminal is to receive the service, the relay apparatus associates the information of the service corresponding to the information of the terminal in the second table and the information of the terminal and registers the associated information in the third table.

12. The apparatus according to claim 1, wherein the relay apparatus performs:
    a confirmation of whether a session by the first communication protocol is established with the terminal when information is to be transmitted to the terminal, and
    a transmission of the predetermined signal to the terminal by the first communication after the establishment of the session with the terminal by the first communication protocol is confirmed.

13. The relay apparatus according to claim 12, wherein the session by the first communication protocol is established between the relay apparatus and the terminal based on an operation made on the terminal by a user.

14. The apparatus according to claim 1, wherein
    the relay apparatus can execute the first communication to transmit the predetermined signal to the terminal by using a third communication protocol different from the first communication protocol and the second communication protocol, and
    the relay apparatus selects whether to transmit the predetermined signal to the terminal by using one of the first communication protocol and the third communication protocol based on a load of the first communication and/or a characteristic of information to be transmitted.

15. The apparatus according to claim 14, wherein the third communication protocol includes an MQTT (Message Queuing Telemetry Transport) protocol.

16. The apparatus according to claim 1, wherein the first communication protocol includes an MQTT (Message Queuing Telemetry Transport) protocol.

17. The apparatus according to claim 1, wherein the first communication protocol includes XMPP (Extensible Messaging and Presence Protocol).

18. The apparatus according to claim 1, wherein the second communication protocol includes HTTP (Hyper Text Transfer Protocol).

19. A control method executed by a relay apparatus that relays a server which provides a service and a terminal which receives a service, the method comprising:
    transmitting, by a first communication, a predetermined signal to the terminal in accordance with a first communication protocol;
    receiving, by a second communication, a response to the predetermined signal by the first communication from the terminal in accordance with a second communication protocol different from the first communication protocol and without using the first communication protocol; and
    communicating, by a third communication, with the server based on the reception of the response.

20. An information processing system that includes a terminal which receives a service provided by a server, and a relay apparatus which relays communication between the server and the terminal, wherein the relay apparatus comprises
    at least one first processor, and
    at least one first memory coupled to the at least one first processor, wherein the at least one first memory stores a computer-readable instruction that causes, when executed by the at least one first processor, the relay apparatus to execute a first communication to transmit a predetermined signal to the terminal in accordance with a first communication protocol, and execute a second communication to receive a response to the predetermined signal by the first communication from the terminal in accordance with a second communication protocol different from the first communication protocol, and execute a third communication to communicate with the server based on the reception of the response, and the terminal comprises at least one second processor, and at least one second memory coupled to the at least one second processor, wherein the at least one second memory stores a computer-readable instruction that causes, when executed by the at least one second processor, the terminal to receive the predetermined signal from the relay apparatus in accordance with the first communication protocol, and transmit a response to the predetermined signal to the relay apparatus in accordance with the second communication protocol and without using the first communication protocol.

* * * * *